US009990422B2

(12) United States Patent
Chang

(10) Patent No.: US 9,990,422 B2
(45) Date of Patent: Jun. 5, 2018

(54) CONTEXTUAL ANALYSIS ENGINE

(71) Applicant: Adobe Systems Incorporated, San Jose, CA (US)

(72) Inventor: Walter Chang, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 555 days.

(21) Appl. No.: 14/054,351

(22) Filed: Oct. 15, 2013

(65) Prior Publication Data

US 2015/0106078 A1 Apr. 16, 2015

(51) Int. Cl.
*G06F 17/30* (2006.01)
(52) U.S. Cl.
CPC .............. *G06F 17/30705* (2013.01)
(58) Field of Classification Search
None
See application file for complete search history.

(56) References Cited

U.S. PATENT DOCUMENTS

| | | | |
|---|---|---|---|
| 7,610,315 | B2 | 10/2009 | Chang et al. |
| 7,624,103 | B2 | 11/2009 | Wiegering et al. |
| 7,644,052 | B1 | 1/2010 | Chang et al. |
| 7,849,081 | B1 | 12/2010 | Chang et al. |
| 7,873,640 | B2 | 1/2011 | Chang et al. |
| 8,015,175 | B2 | 9/2011 | Fairweather |
| 8,046,355 | B2 | 10/2011 | Alfonseca et al. |
| 8,090,724 | B1 | 1/2012 | Welch et al. |
| 2005/0234953 | A1 | 10/2005 | Zhang et al. |
| 2006/0004752 | A1* | 1/2006 | Harel ............ G06F 17/3087 |
| 2006/0059143 | A1* | 3/2006 | Palmon ........ G06F 17/30286 |
| 2006/0089924 | A1* | 4/2006 | Raskutti ........ G06F 17/3071 |
| 2007/0294230 | A1 | 12/2007 | Sinel et al. |
| 2008/0140616 | A1* | 6/2008 | Encina ......... G06F 17/30864 |
| 2008/0201326 | A1* | 8/2008 | Cotter .......... G06F 17/30864 |

(Continued)

OTHER PUBLICATIONS

Bisson, et al., "Designing clustering methods for ontology building: The Mo'K workbench", Proceedings of the ECAI Ontology Learning Workshop, pp. 13-19 (2000).

(Continued)

*Primary Examiner* — James Trujillo
*Assistant Examiner* — Aida Tessema
(74) *Attorney, Agent, or Firm* — Finch & Maloney PLLC

(57) ABSTRACT

A contextual analysis engine systematically extracts, analyzes and organizes digital content stored in an electronic file such as a webpage. Content can be extracted using a text extraction module which is capable of separating the content which is to be analyzed from less meaningful content such as format specifications and programming scripts. The resulting unstructured corpus of plain text can then be passed to a text analytics module capable of generating a structured categorization of topics included within the content. This structured categorization can be organized based on a content topic ontology which may have been previously defined or which may be developed in real-time. The systems disclosed herein optionally include an input/output interface capable of managing workflows of the text extraction module and the text analytics module, administering a cache of previously generated results, and interfacing with other applications that leverage the disclosed contextual analysis services.

16 Claims, 20 Drawing Sheets

(56) References Cited

U.S. PATENT DOCUMENTS

| | | | |
|---|---|---|---|
| 2008/0270384 A1* | 10/2008 | Tak | G06F 17/30734 |
| 2009/0254512 A1* | 10/2009 | Broder | G06Q 30/02 |
| 2009/0319342 A1* | 12/2009 | Shilman | G06F 17/30864 |
| | | | 705/7.41 |
| 2009/0319518 A1 | 12/2009 | Koudas et al. | |
| 2010/0082628 A1* | 4/2010 | Scholz | G06F 17/30705 |
| | | | 707/740 |
| 2010/0138451 A1 | 6/2010 | Henkin et al. | |
| 2011/0125759 A1* | 5/2011 | Querel | G06F 17/30899 |
| | | | 707/748 |
| 2011/0196737 A1* | 8/2011 | Vadlamani | G06F 17/30864 |
| | | | 705/14.49 |
| 2011/0213655 A1* | 9/2011 | Henkin | G06Q 30/00 |
| | | | 707/748 |
| 2012/0226559 A1 | 9/2012 | Baum et al. | |
| 2012/0226560 A1 | 9/2012 | Chang et al. | |
| 2012/0226697 A1 | 9/2012 | Chang et al. | |
| 2012/0226700 A1 | 9/2012 | Chang et al. | |
| 2013/0173610 A1* | 7/2013 | Hu | G06F 17/30864 |
| | | | 707/728 |
| 2013/0232147 A1* | 9/2013 | Mehra | G06F 17/30731 |
| | | | 707/737 |

OTHER PUBLICATIONS

"The Sedona Conference® Best Practices Commentary on the Use of Search and Information Retrieval Methods in E-Discovery", The Sedona Conference Journal, vol. 8 (Fall 2007).

* cited by examiner

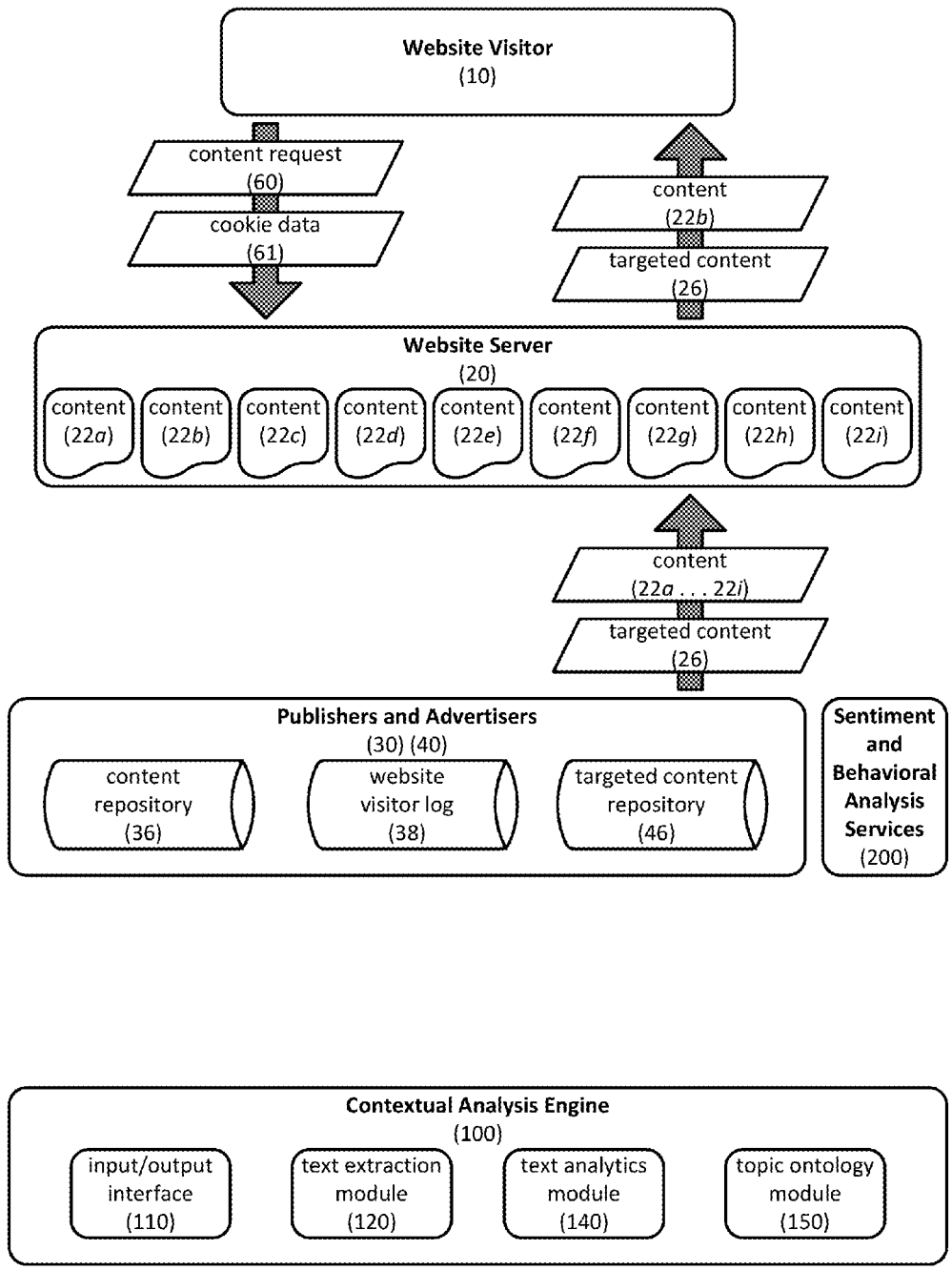

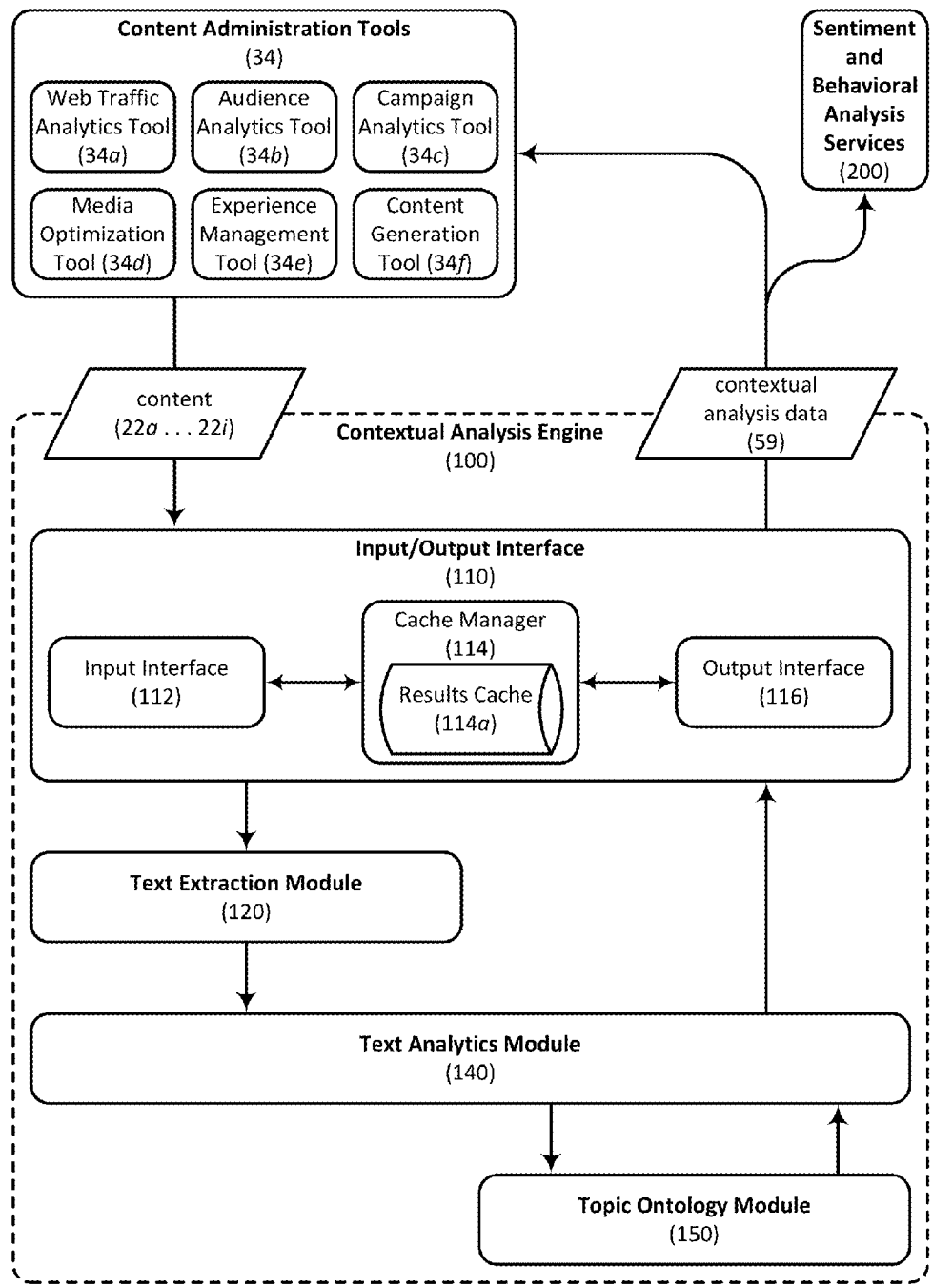

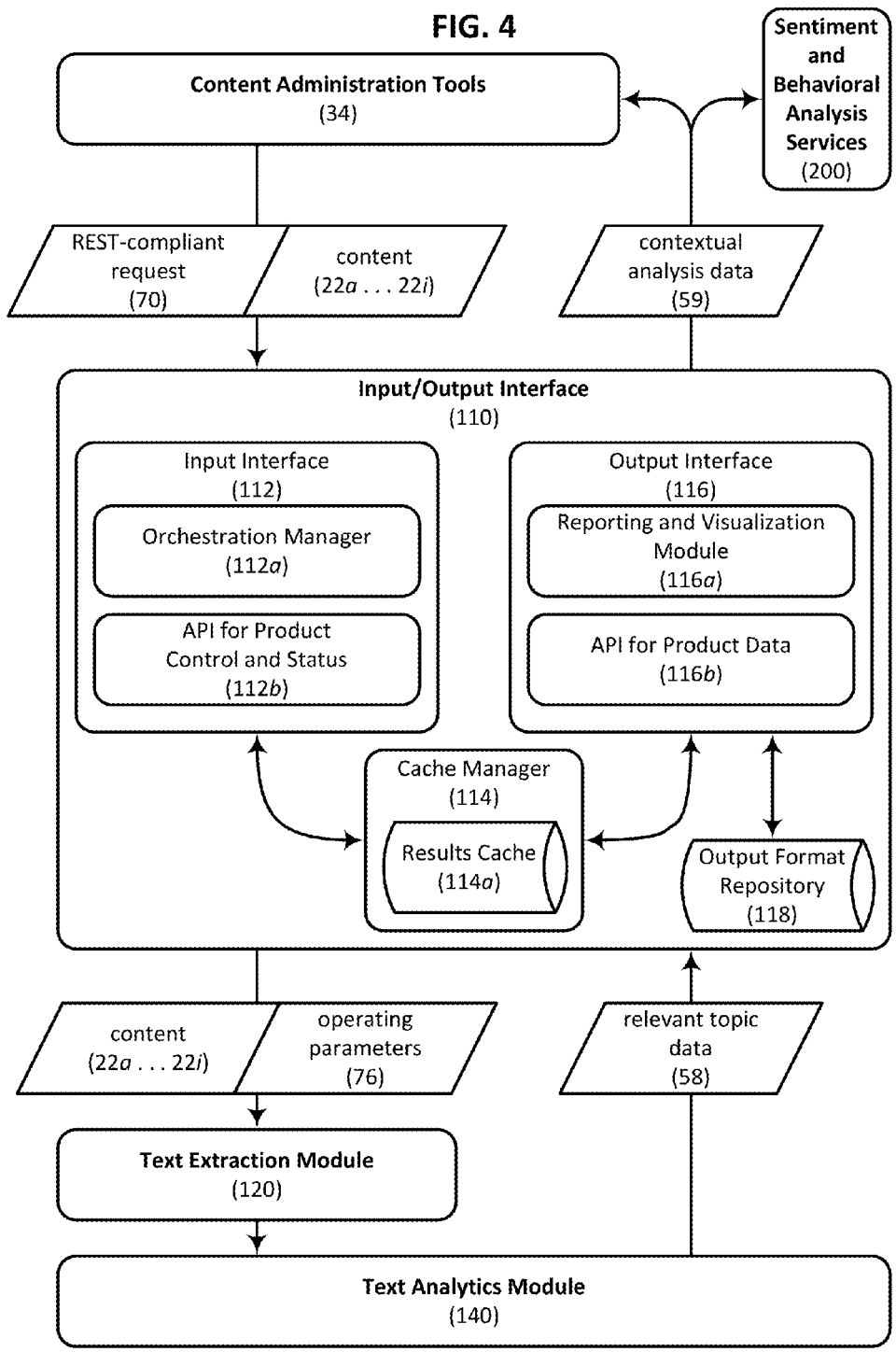

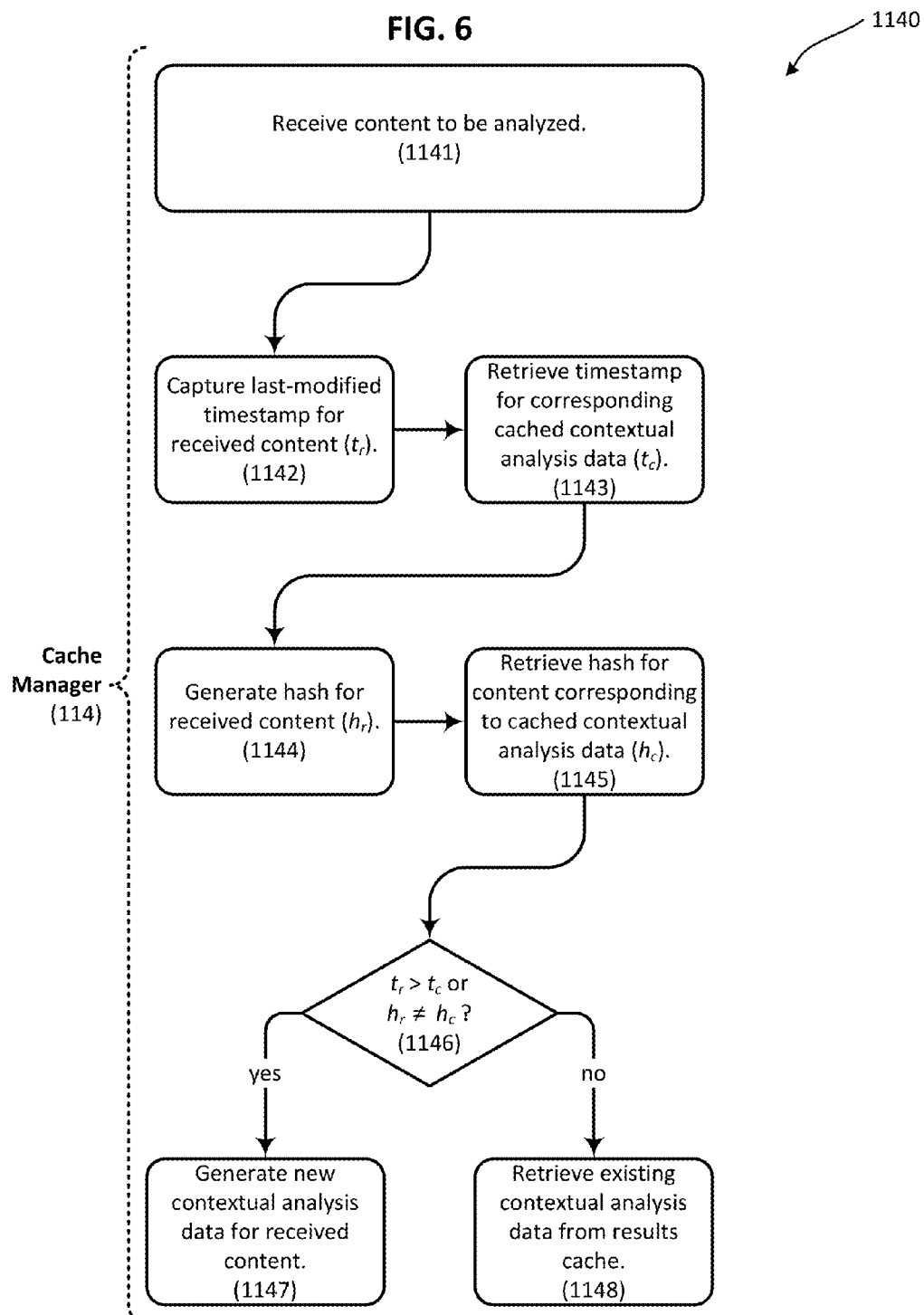

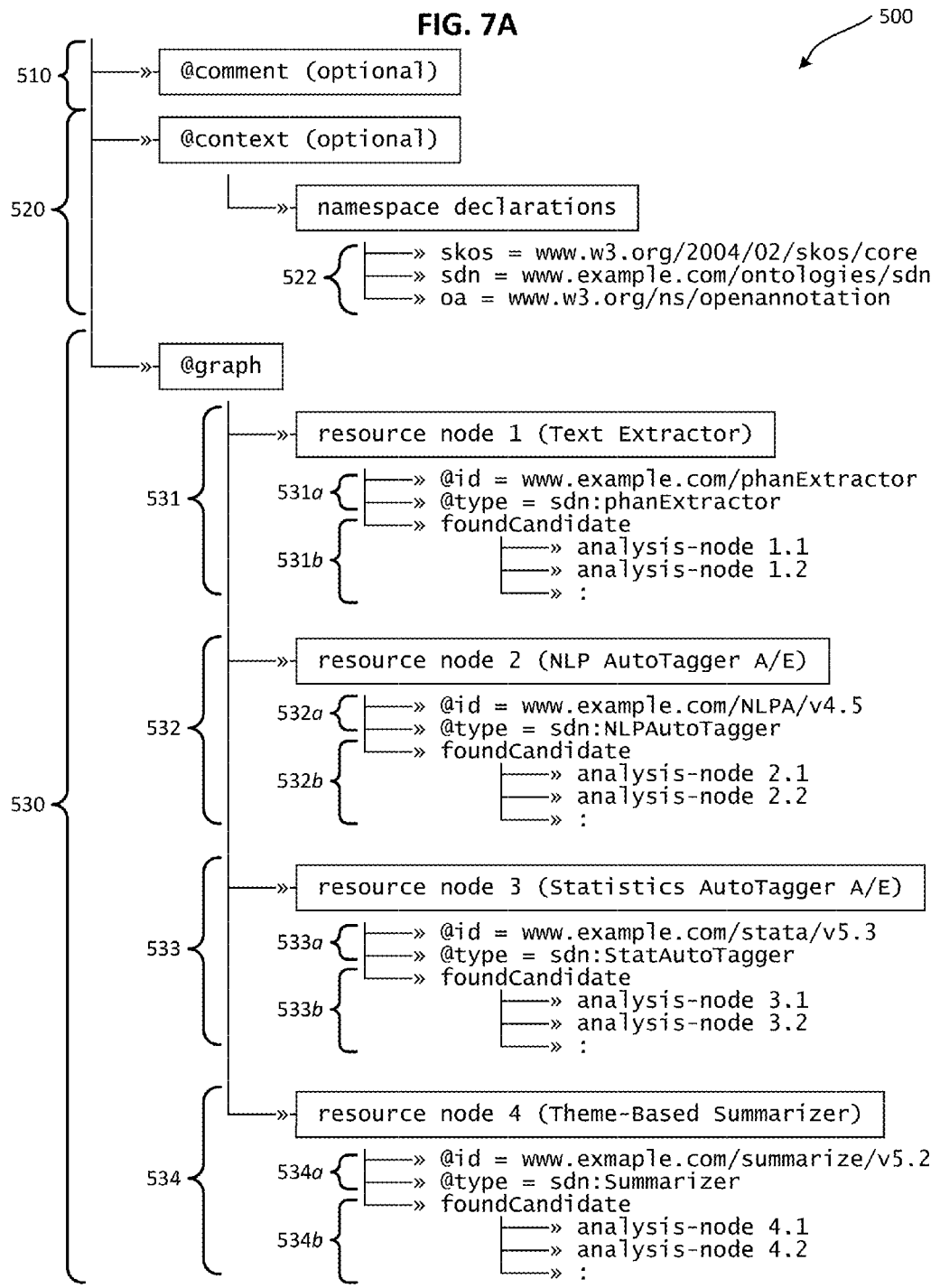

@graph
      ↳»  ┌─────────────────────────────────┐
          │ resource node 1 (Text Extractor) │
          └─────────────────────────────────┘
     ⎧ ↳» @id = www.example.com/phanExtractor
531a ⎨ ↳» @type = sdn:phanExtractor
     ⎩ ↳» foundCandidate
           ↳» comment
                ↳» sdnRules
      ⎧          ↳» phantomExtractText.js
531ba ⎨          ↳» https://www.example.com/videoSitePageLinkRules.js
      ⎩          ↳» https://www.example.com/videoSiteMetadataRules.js
      ⎧ ↳» link_href
531bb ⎨ ↳» link_text
      ⎨ ↳» link_title
      ⎩ ↳» meta_description
531b ⎨           ↳» Learn about the 2014 New Car at Example.com.  See photos...
           ↳» meta_keywords
                ↳» New cars, new car shopping, new car models, hatchback...
531bc   ↳» text: Login Sign in with Saved cars, searches and time. Always...
        ↳» title: 2014 New Car - Prices and Reviews
531bd   ↳» url: http://www.example.com/legacy/research/modelinfo/overview...
```

FIG. 7D

```
@graph
  ┊
  └─» resource node 3 (Statistics AutoTagger A/E)
       ┊
       »  @id = www.example.com/stata/v5.3          ⎱ 533a
       »  @type = sdn:StatAutoTagger                 ⎰
       »  foundCandidate
          »  [0]
              »  @type: oax:Reference
              »  hasSource: _:doc
              »  hasTarget
              540 ⎰─»  sdn:offset
              542 ⎱─»  sdn:value: 2012 New Car
                  »  sdn:length: 12
              546 »  sdn:score: 0.40515              ⎱ 533b'
              548 »  sdn:termfreq: 5
              542 »  tag: New
          »  [1]
              »  @type: oax:Reference
              »  hasSource: _:doc
              »  hasTarget
              540 ⎰─»  sdn:offset
              542 ⎱─»  sdn:value: 2012 New Car Hatchback Model
                  »  sdn:length: 28
              546 »  sdn:score: 0.40463              ⎱ 533b'
              548 »  sdn:termfreq: 3
              542 »  tag: New
  ..
```

```
if (typeof(Phantom) !== "undefined")
{
    function getMetaContent(name)
    {
        var ret = new [];
        var meta = document.getElementsByTagName("meta");

for(var i=0; i<meta.length; i++)
        {
            if (meta[i].getAttribute("name") == name)
            {
                ret.push(meta[i].getAttribute("content"));
            }
        } return ret;
    }

Phantom['meta-description'] = getMetaContent("description");
}
```

FIG. 10A

```
if (typeof(Phantom) !== "undefined")
{
        function getElementsByClassName(classNameStr, element, skipAfterFirst)
        {
                var elements = [];
                if (element.className == classNameStr)
                {
                        elements.push(element);
                }
                for ( var i = 0; i < element.childNodes.length; i++ )
                {
                        var sr = getElementsByClassName(classNameStr,
element.childNodes[i], skipAfterFirst);
                        if (sr.length > 0 )
                        {
                                elements = elements.concat(sr);
                                if (skipAfterFirst)
                                        break;
                        }
                } return elements;
        } function getNodeText(node)
        {
                var ret = "";
                if (node.nodeType == Node.TEXT_NODE)
                {
                        ret = node.nodevalue;
                }
                else
                {
                        for (var c=0; c<node.childNodes.length; c++)
                        {
                                ret += getNodeText(node.childNodes[c]);
                        }
                } return ret;
        } function getElementsTexts( elementArray )
        {
                var ret = [];
                for (var i=0; i<elementArray.length; i++)
                {
                        var txt = getNodeText(elementArray[i]);
                        if (txt.length > 0)
                                ret.push(txt);
                } return ret;
        }
```

(code continues on Figure 10B)

FIG. 10B (code continues from Figure 10A)

```
        function getAttributeTexts(elementArray, attr)
        {
                var ret = [];
                for (var i=0; i<elementArray.length; i++)
                {
                        var txt =
elementArray[i].getAttribute(attr);
                        if (txt.length > 0)
                                ret.push(txt);
                } return ret;
        } function getMetaContent(name)
        {
                var ret = [];
                var meta = document.getElementsByTagName("meta");

for(var i=0; i<meta.length; i++)
                  {
                        if (meta[i].getAttribute("name") == name)
                        {
                                ret.push(meta[i].getAttribute("content"));
                        }
                } return ret;
        } var e1 = getElementsByClassName("toplink", document.documentElement);
        var e2 = getElementsByClassName("xltitle", document.documentElement);
        var e3 = getElementsByClassName("prodnameshare", document.documentElement);
        var tmp = getElementsByClassName("prodbullets pdbulletswrap",
document.documentElement);
        var e4 = [];
        for(var i=0; i<tmp.length; i++)
        {
                e4 = e4.concat(getElementsByClassName("bodytext", tmp[i], true));
        }
        Phantom['toplink'] = getAttributeTexts(e1, "title");
        Phantom['xltitle'] = getElementsTexts(e2);
        Phantom['prodnameshare'] = getElementsTexts(e3);
        Phantom['prodbullets_pdbulletswrap'] = getElementsTexts(e4);
        Phantom['meta_keywords'] = getMetaContent("keywords");
        Phantom['meta_description'] = getMetaContent("description");
        Phantom['url'] = document.URL;
}
```

FIG. 13A                                                     58

```
┌─» 0.439-World Localities,36
│  └─» 1.000-Europe,36
│        ├─» 0.861-Central & Eastern Europe,31
│        │     ├─» 0.613-Czechoslovakia,19
│        │     │     ├─» 0.632-Czech Republic,12
│        │     │     │     ├─» 0.667-Czech Republic,8
│        │     │     │     ├─» 0.250-Bohemia,3
│        │     │     │     └─» 0.083-Prague,1
│        │     │     └─» 0.368-Chechoslovakia,7
│        │     ├─» 0.194-Poland,6
│        │     │     ├─» 0.667-Poland,4
│        │     │     └─» 0.333-Warsaw,2
│        │     ├─» 0.065-Austria,2
│        │     │     └─» 1.000-Austria,2
│        │     ├─» 0.065-Germany,2
│        │     │     ├─» 0.500-Bavaria,1
│        │     │     │     └─» 1.000-Munich,1
│        │     │     └─» 0.500-Germany,1
│        │     └─» 0.065-Slovakia,2
│        │           └─» 1.000-Slovakia,2
│        ├─» 0.056-Europe,2
│        ├─» 0.028-Nordic Countries,1
│        │     └─» 1.000-Finland,1
│        │           └─» 1.000-Helsinki,1
│        ├─» 0.028-Western Europe,1
│        │     └─» 1.000-Benelux,1
│        │           └─» 1.000-Luxembourg,1
│        └─» 0.028-Southeastern Europe,1
│              └─» 1.000-Romania,1
├─» 0.207-News,17
│  ├─» 0.588-World News,10
│  │     ├─» 0.900-World News/RT,9
│  │     │     ├─» 0.444-OSCE,4
│  │     │     ├─» 0.222-European Union,2
│  │     │     ├─» 0.111-Revolution,1
│  │     │     ├─» 0.111-border,1
│  │     │     └─» 0.111-OECD,1
│  │     └─» 0.100-World Leaders,1
│  │           └─» 1.000-World Leaders/NTI,1
│  │                 └─» 1.000-Klaus,1
⋮  ⋮
```

FIG. 13B

```
⋮
├─» 0.613-Czechoslovakia, 19
    ⎵       ⎵          ⎵
    58a     58b         58c
```

CONTEXTUAL ANALYSIS ENGINE

FIELD OF THE DISCLOSURE

This disclosure relates generally to evaluation of digital content consumed by a user, and more specifically to methods for performing such evaluation in a way that provides publishers, advertisers and/or marketers actionable information with respect to the user's interests.

BACKGROUND

As the number of people with access to the Internet continues to grow, websites have become an increasingly important way for businesses and consumers to interact. For example, businesses routinely use websites to distribute information about products and services, conduct advertising and public relations campaigns, and transact business by receiving orders and payments. As a result, website owners often devote substantial resources to analyzing the characteristics and activities of the visitors to their webpages. This analysis, which is generally referred to as website traffic analysis, has been used to support the development of webpages that include dynamically-generated content that is specifically targeted toward a particular user or audience.

BRIEF DESCRIPTION OF THE DRAWINGS

FIG. 2C is a data flow diagram schematically illustrating how targeted content can be delivered from a website server to a website visitor in accordance with an embodiment of the present invention.

FIG. 3 is a block diagram schematically illustrating data flow between selected components of a system that can be used to evaluate digital content consumed by a user in accordance with an embodiment of the present invention.

FIG. 4 is a block diagram schematically illustrating selected components of an input/output interface that is configured in accordance with an embodiment of the present invention and that forms part of the contextual analysis engine of FIG. 3.

FIG. 6 is a flowchart illustrating a method for determining whether contextual analysis data corresponding to an incoming contextual analysis request is available in a results cache in accordance with an embodiment of the present invention.

FIG. 7A illustrates selected portions of an example output schema that can be used to report and visualize contextual analysis data generated by contextual analysis engine in accordance with an embodiment of the present invention.

FIG. 7C illustrates an expanded view of an example @graph resource node that forms part of the output schema of FIG. 7A, the @graph resource node including data generated by a text extraction service in accordance with an embodiment of the present invention.

FIG. 7D illustrates an expanded view of an example @graph resource node that forms part of the output schema of FIG. 7A, the @graph resource node including data generated by a text analytics service in accordance with an embodiment of the present invention.

FIG. 9 illustrates a modular extraction rule that can be used to extract metadata from a webpage in accordance with an embodiment of the present invention.

FIGS. 10A and 10B illustrate a modular extraction rule that can be used to extract elements such as titles, text, metadata and page links from a webpage in accordance with an embodiment of the present invention.

FIG. 13A illustrates portions of an example hierarchical topic model listing relevant topic data generated by a topic categorizer in accordance with an embodiment of the present invention.

FIG. 13B illustrates an example branch of the hierarchical topic model of FIG. 13A, the branch containing relevant topic data generated by a topic categorizer in accordance with an embodiment of the present invention, the relevant topic data including a topic, a relevancy score and a frequency count.

DETAILED DESCRIPTION

Figure 1:
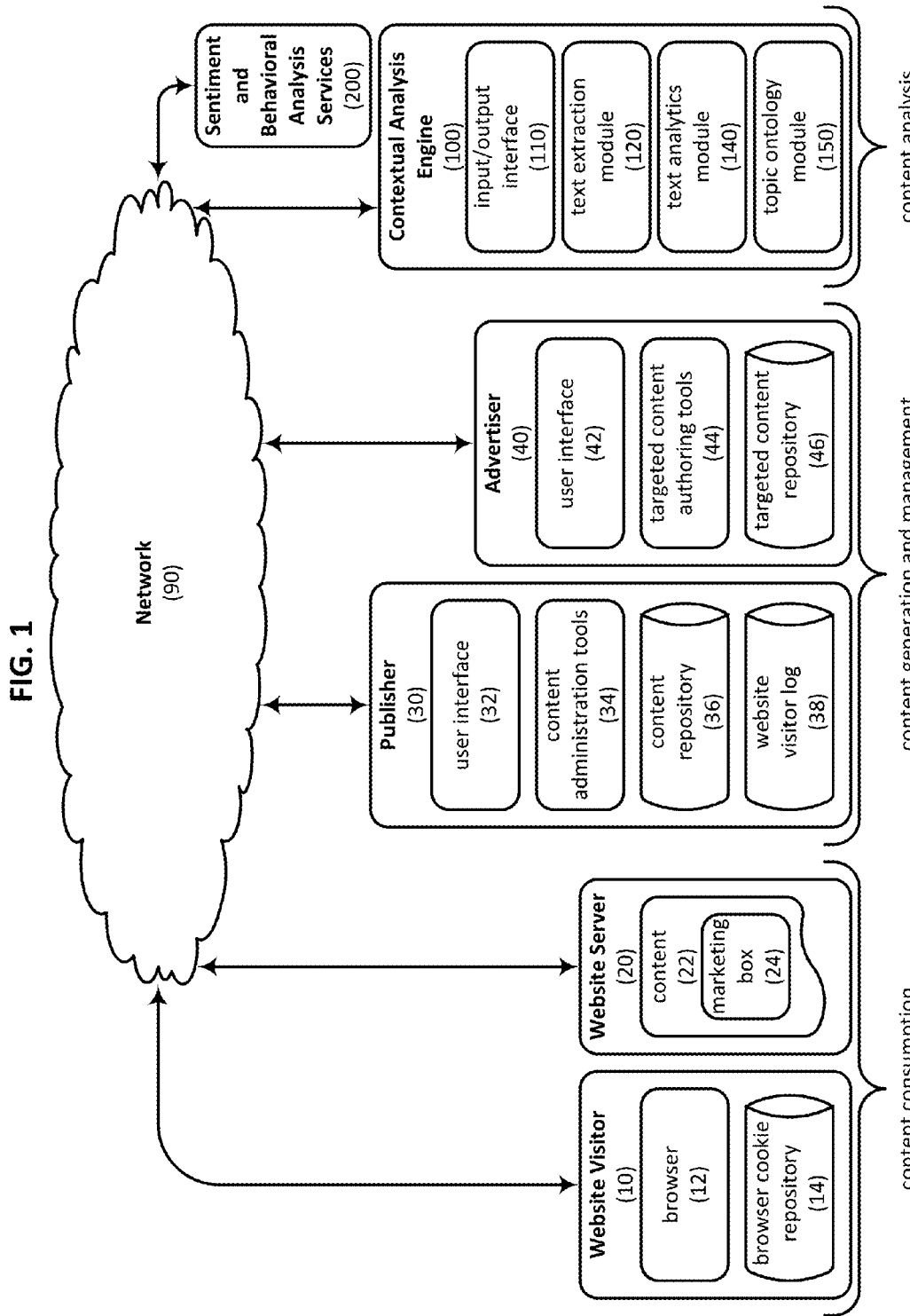
FIG. 1 is a block diagram schematically illustrating how content consumers, content generators and content managers can interact with a contextual analysis engine in accordance with an embodiment of the present invention.

Disclosed herein are various embodiments of a contextual analysis engine that is capable of systematically extracting, analyzing and organizing digital content, thereby providing actionable information with respect to the interests of a user consuming the content. Such a contextual analysis engine can process content stored in one or more electronic files such as hypertext markup language (HTML) files and portable document format (PDF) files. Content can be extracted from such files using a text extraction module which is capable of separating the content which is to be analyzed from less meaningful content such as headers, format specifications, programming scripts and other data which is not of interest. This text extraction process results in an unstructured or semi-structured corpus of plain text which can then be passed to a text analytics module capable of generating a structured categorization of topics included within the content. This structured categorization can be organized based on a content topic ontology which may have been previously defined, or which may be developed in real-time based on the content being analyzed. The systems disclosed herein optionally include an input/output interface capable of managing workflows of the text extraction module and the text analytics module, administering a cache of previously generated results, and interfacing with other applications that leverage the services of the contextual analysis engine. Numerous configurations and variations of such techniques will be apparent in light of this disclosure.

As used herein, the term "content" refers, in addition to its ordinary meaning, to information intended for direct or indirect consumption by a user. For example, the term content encompasses information directly consumed by a user such as when it is displayed on a display device or printed on a piece of paper. The term content also includes information that is not specifically intended for display, and therefore also encompasses items such as software, executable instructions, scripts, hyperlinks, addresses, pointers, metadata, and formatting information. The use of the term content is independent of (a) how the content is presented to the user for consumption and (b) the software application used to create and/or render the content. The term "digital content" refers to content which is encoded in binary digits (for example, zeroes and ones); in the context of applications involving digital computers, the terms "content" and "digital content" are often used interchangeably. The term "targeted content" refers to content which is targeted or otherwise intended, optimized or prepared for consumption by a specific user, audience or other group.

As used herein, the term "contextual analysis" refers, in addition to its ordinary meaning, to the modeling of information and behavior that can be used to infer a consumer's interest, intention and/or sentiment about a topic, product or combination thereof. Contextual analysis collects a variety of information from multiple sources, such as content read or generated by a consumer, and may also optionally rely on information derived from demographic, geographic, situational, psychological and social channels. Thus contextual analysis provides publishers and advertisers with an advanced semantic analysis capability to understand consumer interest and intent. Contextual analysis leverages semantic, statistical and linguistic textual analysis techniques to extract and analyze content, extract and rank topics and keywords contained within the content, and match such topics to relevant content generated by, for example, a publisher or an advertiser. The data generated as a result of contextual analysis may relate not only to topics, but additionally or alternatively to themes, concepts and topic entities generally.

As used herein, the term "actionable information" refers, in addition to its ordinary meaning as understood in the field of descriptive, predictive and prescriptive analytics, to information that can be used by analysts, such as publishers and advertisers, to recommend targeted content to consumers to increase or optimize recommendation efficiency. Recommendation efficiency can be measured according to a variety of return-on-investment metrics, such as click-through rate, cost per impression, or conversion rate.

As used herein, the term "text extraction" refers, in addition to its ordinary meaning, to the extraction of textual information from content. Text extraction may include, for example, utilities that provide automated web page scraping and article reading functionality. In certain embodiments, the utilities used for text extraction may be capable of, for example, distinguishing parts of a webpage which represent the content of an article from other common website building blocks such as menus, headers, footers, advertisements, and the like. As described herein, text extraction can be understood as a precursor to text analytics processing.

As used herein, the term "text analytics" refers, in addition to its ordinary meaning, to the process of deriving actionable information from unstructured, semi-structured or structured text, such as from the text extracted from a webpage. Actionable information can be derived through the discovery of patterns and trends using techniques such as statistical pattern matching and machine leaning. Text analytics may include processes such as the structuring and annotation of extracted text, the parsing of extracted text based on derived linguistic and semantic features, the persistence of the resulting structured data into a metadata repository or other database, and the derivation of patterns detected within the structured data. Text analytics may include text normalization to a common encoding, text categorization, text clustering, named entity extraction, construction of topic ontologies, sentiment analysis, document summarization and/or derivation of relationships between the identified named entities.

As used herein, the term "ontology" refers, in addition to its ordinary meaning, to a hierarchical knowledge structure that contains a vocabulary of terms and concepts for a specific knowledge domain and that establishes relevant relationships between those terms and concepts. Ontologies can be understood as including terms and concepts that are members of one or more classes based on a shared property. Large symbolic ontologies are often graphically represented by a tree structure. At the leaf level of the ontology, a domain-specific set of rules can be used to define the specific attributes of a product; examples of such attributes may include color, style, size and intended gender. Items within the ontology may be either values without more detailed attributes (for example, sport chronograph watch), or may optionally include additional attribute information (for example, "intended gender=men's" or "color=black"). A list of allowable category and item values provides a controlled vocabulary for the attributes. Categories within the ontology may have more than one parent category; thus, for example, the aforementioned sport chronograph watch may be categorized under both "Watches" and "Sporting Goods". There are numerous ontology standards, building and editing tools, as well as ontology-based document classification systems. For example, the Web Ontology Language (OWL), which has been endorsed by the World Wide Web Consortium (W3C), can be used to author and characterize the ontologies invoked herein.

Ontologies also include axioms which place constraints on classes and the types of relationships permitted between them, thereby allowing additional information to be inferred based on some given initial data. For example, an ontology describing a family might include individuals John and Jim who are members of a class defined by a "Has Type O Blood" property. Properties can also be used to establish relationships between individuals; for example if John and Jim are brothers, they can be related to individual Jane by a "Has Mother" property (that is, John and Jim have a mother who is Jane). Ontologies that describe families might include axioms such as (a) the "Has Mother" property is only present between two individuals when a "Has Parent" property is also present, and (b) individuals having the "Has Type O Blood" property are never related via the "Has Parent" property to an individual having a "Has Type AB Blood" property. Thus, this ontology allows it to be inferred that Jane is not a member of a class defined by the "Has Type AB Blood" property, even though this was not expressly stated initially.

General Overview

The rapid growth of the Internet has presented business owners with both opportunities and challenges. The large number of people with access to the Internet allows business owners to reach a far larger and more diverse audience of potential customers than ever before. However, this vast audience has attracted a commensurately large number of businesses trying to reach those potential customers, each attempting to set itself apart from the competition. Adding to this challenge is the fact that business owners often have limited information with respect to the people who see their advertising, respond to their advertising, and visit their websites. These factors have made it more difficult for business owners to effectively target their online marketing efforts to individuals likely to be interested in the product or service being offered. To address these challenges, systems have been developed which attempt to associate a consumer's online activities with products and/or services in which the consumer is likely to be interested. Using such tools, business owners often attempt to gather as much information about a consumer's online activities as possible. This information can be used to define "market segments", which are groups of consumers having similar interests. In general, the more precisely defined a particular market segment is, the more effectively targeted content can be delivered to that market segment.

One area in which business owners have focused their efforts is in the monitoring and analysis of the digital content that is consumed by potential customers. If a website owner, also referred to herein as a "publisher", has a detailed and accurate profile of what a particular website visitor is reading, then that publisher can more effectively attract advertisers who want to target that website visitor. In particular, evaluating the advertisements, product descriptions, and other content that a consumer views allows the consumer's interests to be gauged, and more importantly, allows accurate predictions to be made about the consumer's purchase intentions. Information that can be inferred from an analysis of the content that a person, such as a website visitor, consumes is referred to herein as "contextual information" or "contextual analysis data".

For example, a person who views webpages containing articles about baseball, webpages published by baseball teams, and webpages that sell baseball tickets and memorabilia can be inferred to be a baseball fan, and depending on the specific content consumed, may be inferred to be a fan of a specific baseball team or even a specific baseball player. Contextual information such as this can be used to correlate particular consumers with particular market segments and to associate certain content with such market segments. Such associations and correlations can be used to establish a connection between publishers and the advertisers that want to reach the consumers who are attracted to the publishers' content. In other words, contextual information drives similarity metrics between consumers and publishers, and thus allows publishers to attract advertisers. For example, contextual information about the content consumed by the aforementioned baseball fan may enable a publisher to deliver an advertisement to the fan specifically related to the team or player in which the fan is interested. A user identified as having a specific interest in a particular baseball team is more likely to respond to certain targeted content than a user having other interests or unknown interests. The utility of contextual information is based on the principle that consumers who tend to view similar content tend to have similar behavior. To provide another example, website visitors who view customer service webpages more likely intend to find product help than users who view product information pages and place items into shopping carts.

However, despite the widely recognized value of such contextual information, there are still substantial challenges in systematically learning and understanding what website visitors are reading. Advertisers and publishers often rely on inconsistent and ad hoc methods that provide unreliable data. For instance, many advertisers employ analysts who manually review webpage logs to obtain inconsistent and disjointed ideas about what website visitors are reading. Those disjointed ideas are then used to create customized ontologies for each piece of content which is to be analyzed. In addition, the sheer quantity of text available to be analyzed is massive and calls for scalable, high performance systems that can accomplish this evaluation in a way that is consistent, efficient and automated. This is particularly true given that evaluating a greater volume of content generally results in more accurate contextual information being generated. Adding to this challenge is that fact that content designed for human consumption is generally semi-structured or unstructured, and therefore calls for natural language processing and text mining algorithms to be used to derive actionable contextual information therefrom. As used herein, "unstructured" text refers to textual data that does not correspond to a data model or is otherwise unorganized, such as textual data provided in an array of words. Deriving actionable contextual information from unstructured text often calls for resolving irregularities and ambiguities using, for example, natural language processing resources.

While existing content management tools are sometimes used to classify webpages into a high level topic categorization, such tools generally do not provide sufficient granularity to generate topic models that are detailed enough for an advertiser to generate useful targeted content recommendations. Hierarchical topic models that capture the key concepts contained within content do not exist, would be difficult to create, and would require customized software to be coded. Thus there exists a demand for an efficient and systematic way to generate contextual information that accurately associates market segments with content, thereby providing an automated link between an advertiser and a publisher that generates content which will likely be consumed by the advertiser's targeted market segment. Generation of such contextual information would be facilitated by ontology tools that allow topics extracted from the analyzed content to be rapidly and automatically categorized into default or custom-generated ontologies.

Thus, and in accordance with certain embodiments of the present invention, a contextual analysis engine that is capable of systematically extracting, analyzing and organizing digital content is provided. This allows actionable information with respect to the interests of a content consumer to be provided. In such embodiments, content extraction can be provided by a text extraction module that separates the content which is to be analyzed from content which provides little or no insight into a consumer's interests. In one embodiment, the text extraction module comprises a specialized document object model (DOM) based website extraction module capable of processing dynamic content. To accomplish this filtering of less relevant content, the text extraction module can be configured in a way that overcomes webpage crawling and text extraction problems that may occur when JavaScript or other dynamic content rendering methods are used to generate web content. This allows text to be extracted from a wide variety of content without the need to generate customized scraping applications. The text extraction module is optionally provided with a "plug-and-play" architecture that allows third party feature extraction rules to be injected and implemented. This allows developers with specialized knowledge relating to feature extraction to focus on generating rules specifically adapted for their use cases without having to consider factors such as component interfacing and scalability.

Once text extraction has been performed, content analysis can then be provided by an optional text analytics module capable of using statistical, semantic, and natural language analytics to generate a structured categorization of topics included within the extracted text. For example, in one embodiment the text analytics module identifies topics contained within the extracted content using language specific stemming, tokenization, sentence boundary detection, term decompounding, n-gram extraction, entity pattern matching, and named entity recognition techniques. Such techniques may be customized for a specific topic domain such as a specific website. Once identified, the topics can be organized using compact high dimension document feature vectors based on statistical n-gram and symbolic natural language models, thereby allowing the original content to be summarized. The identified topics are then optionally generalized using ontology tools that allow topic ontologies to be automatically generated and reused. For instance, default document classifiers and topic categorizers that use upper level ontologies can be provided as a seed for automatically generating lower level ontologies based on the analyzed content. In addition, a single piece of digital content, such as a single file or single webpage, can be mapped into multiple ontologies.

An optional input/output interface is capable of flexibly managing workflows of the text extraction and analytics modules, administering a cache of previously generated results, and interfacing with other applications that leverage the services of the contextual analysis engine. For instance, the input/output interface can be provided with an extensible representational state transfer (REST) architecture that allows the services provided by the contextual analysis engine to be scaled and used by a wide variety of clients. Based on these features, certain embodiments of the contextual analysis engine facilitate the process of linking the activities of a webpage visitor to topic models extracted from content on the visited webpage, thereby providing publishers with contextual information associated with the website visitor, and optionally, the market segment to which the website visitor belongs. Certain embodiments provide metadata representations for communicating extraction and analysis data generated by the text extraction and analytics modules, as well as the ontology tools. Actionable outputs include, for example, specific recommendations with respect to targeted content that should be delivered to a particular website visitor, or to a market segment generally.

Thus, certain embodiments of the present invention provide a comprehensive and flexible system for understanding the content that a consumer views, thereby allowing advertisers and publishers to develop detailed topic models of the content in which that consumer is interested. Reference to specific portions of certain embodiments, such as the aforementioned input/output interface, the text extraction module, the text analytics module and the ontology tools, is not intended to be structurally limiting or to otherwise imply any particular degree of modularity. Instead, the various functionalities disclosed herein can be implemented with varying degrees of modularity and integration. It will also be appreciated that the contextual analysis systems and techniques disclosed herein can be applied not only to webpages, but to a wide variety of both online and offline content, including PDF files, word processing documents, presentation materials and spreadsheets. Thus other embodiments can be implemented in other contexts where delivery of targeted content is useful, such as in the context of a retail point-of-sale environment, an online videogame environment, a television broadcast, or any other suitable digital media setting.

System Architecture

FIG. 1 is a block diagram schematically illustrating how content consumers, content generators and content managers can interact with a contextual analysis engine in accordance with an example embodiment. In such an embodiment, content consumption is represented by website visitor 10 and website server 20, both of which are connected to, and can communicate with each other via, network 90. More specifically, website visitor 10 represents a content consumer who uses a browser 12 to retrieve and view content 22 hosted by website server 20. In certain embodiments website server 20 is a single stand-alone server configured to respond to requests for content 22 from website visitor 10, although it other embodiments website server 20 comprises a geographically distributed network of hundreds or thousands of servers capable of delivering content to an even larger number of website visitors 10. Furthermore, it will be appreciated that even though website visitor 10 and website server 20 are described here in terms specific to the World Wide Web, in alternative embodiments website visitor 10 and website server 20 represent networked clients and servers operating in a client-server computing environment generally.

In certain implementations, communications between website visitor 10 and website server 20 conform to the hypertext transfer protocol (HTTP). The HTTP is a stateless protocol, meaning that, in such implementations, website server 20 does not retain information about website visitor 10. To compensate for this, browser 12 can be configured to store such information using "browser cookies", which are also sometimes referred to as HTTP cookies, web cookies, or simply, cookies. A browser cookie is a data structure that contains information regarding website visitor 10, such as personally identifying information and/or web browsing history information. Browser cookies can be stored in a browser cookie repository 14 that is administered by website visitor 10, and can be sent to website server 20 along with a request for content 22. Accessing the data stored in a browser cookie enables website server 20 to obtain information regarding website visitor 10, including identifying information, and thus allows website server 20 to customize, modify or otherwise adapt content 22 to be more specifically targeted to website visitor 10. The data provided in a browser cookie can also be used to establish a link between a particular website visitor and the content that visitor has consumed.

One way that website server 20 may adapt content 22 to be more specifically targeted to website visitor 10 is through the use of a marketing box 24 provided within content 22. Marketing box 24, also sometimes referred to as a "webpage zone" or an "mbox", is a software component that enables targeted content to be received, incorporated into existing content and rendered in browser 12. In other words, marketing box 24 can be seen as a placeholder for targeted content which is to be incorporated into content 22 and delivered to website visitor 10. The targeted content which is provided in place of marketing box 24 may depend, for example, on data provided to website server 20 in a browser cookie received from website visitor 10. Thus a website visitor with a browsing history that indicates an interest in baseball may have an advertisement for baseball tickets appear in the marketing box, while a user with a browsing history that indicates an interest is cooking may have an advertisement for a cooking school appear in the marketing box. Such systems allow publishers to increase the likelihood of attracting consumers by generating marketing messages that are targeted to a specific audience.

Still referring to the example embodiment illustrated in FIG. 1, content generation and management are represented by a publisher 30 and an advertiser 40, both of which are connected to network 90, thereby enabling communication with each other, as well as with website server 20. Publisher 30 represents a generator of content, such as an online magazine, a website owned by a newspaper company, a blog, a government website that disseminates information to the public, or a corporate website that provides information to customers and potential customers. Advertiser 40 represents a generator of supplemental content that may be incorporated into existing content generated by publisher 30, such as through the use of marketing box 24. In some cases publisher 30 and advertiser 40 may comprise the same entity, such as where a company places a banner advertisement on an article published on its own website. While both publisher 30 and advertiser 40 may be considered as generators of targeted content in the sense that each may produce content intended for a specific audience, in the context of this disclosure, advertiser 40 can be considered as producing content that is targeted at the existing audience consuming the content generated by publisher 30. In some cases advertiser 40 can be considered as producing content that is targeted to a specific website visitor whose content consumption patterns have been analyzed. In either case, certain of the embodiments disclosed herein provide tools that publisher 30 and advertiser 40 can use to develop a detailed and accurate profile of the publisher's existing audience, either individually or collectively, thereby allowing the advertiser's content to be targeted appropriately. Such tools also allow a publisher to attract advertisers who wish to reach the target audience that the publisher has established.

Publisher 30 and advertiser 40 use a variety of different tools that provide a user interface 32, 42 for facilitating the generation and management of content. Such tools include content administration tools 34 which can be used to generate content, build websites incorporating the generated content and analyze how visitors browse such websites and consume the content provided therein. Such tools may also include targeted content authoring tools 44 which can be used to author targeted content such as banner advertisements, embedded advertisements and sponsored search results. Both content administration tools 34 and targeted content authoring tools 44 may also include data aggregators that can be used to gather information from other sources and generate content based on the aggregated data, either in an automated or semi-automated fashion. For example, a meteorological data service can be used (a) by a newspaper publisher as a data source for an automatically-generated webpage providing weather forecast information, and (b) by an advertiser as a data source for an automatically-generated advertisement touting the pleasant weather at a particular vacation destination. Regardless of how it is generated, content produced by publisher 30 can be stored in a content repository 36, and when ready for publishing can be deployed to website server 20 where it is hosted for retrieval by website visitor 10. Likewise, targeted content produced by advertiser 40 can be stored in a targeted content repository 46 and deployed to website server 20 for incorporation into existing content, such as via marketing box 24, as appropriate. In an alternative embodiment, publisher 30 and advertiser 40 may collaborate to match the publisher's content with the advertiser's targeted content before the combined content is deployed to website server 20. Other methodologies for pairing and deploying the content generated by publisher 30 and advertiser 40 can be used in other embodiments.

Content administration tools 34 may include tools that can be used to analyze how website visitors interact with and consume a particular subset of content, such as the content that is produced by publisher 30 and that is provided in a given webpage hosted by website server 20. Such analytical tools can be used to identify content consumption patterns that form the basis for generating contextual analysis data. The content consumption patterns may be identified based on tracking of website visitors on an individualized basis, for example, as determined by an analysis of browser cookie data received from website visitors. The content consumption patterns may additionally or alternatively be identified based on tracking of market segments on a collective basis, for example, as determined based on the combined browsing activities of website visitors falling within a certain user profile or browsing content during a given time period. Content consumption patterns can also be discerned from content consumption data collected by website server 20 and aggregated by publisher, such as through the use of a website visitor log 38 maintained by publisher 30. However, regardless of how the content consumption patterns are established, such patterns can be used to identify particular content that is to be subjected to contextual analysis. The resulting contextual analysis data can be used to define market segments, or groups of website visitors having similar interests and/or content consumption patterns. This can be used to establish a link between the content generated by a particular publisher and content produced by a particular advertiser that is targeted toward the particular publisher's market segment, or even toward a particular website visitor consuming the publisher's content. In other words, contextual information facilitates identification of advertisers that want to reach the consumers who are attracted to the particular publisher's content.

Referring again to the example embodiment illustrated in FIG. 1, content analysis can be provided by, for example, contextual analysis engine 100, which is also connected to network 90. Contextual analysis engine 100 can be configured to process content provided by publisher 30 to produce the aforementioned contextual analysis data. In one embodiment contextual analysis engine 100 includes an input/output interface 110 capable of interfacing with the content administration tools 34 used by publisher 30 or providing contextual analysis data to advertiser 40. Input/output interface 110 can also be configured to manage workflows associated with the various subcomponents of contextual analysis engine 100. For instance, in certain embodiments contextual analysis engine includes a text extraction module 120 capable of extracting content which is to be analyzed from less meaningful content received from publisher 30. Examples of less meaningful content include content items such as format specifications, headers and programming scripts. Contextual analysis engine 100 may also include a text analytics module 140 capable of generating a structured categorization of topics included within the content received from publisher 30. This structured categorization can be organized based on a content topic ontology which may have been previously defined, or which may be developed in real-time based on the content being analyzed. The content topic ontology can be generated and/or managed by topic ontology module 150. Contextual analysis data can also optionally be provided to sentiment and behavioral analysis services 200 which can further characterize the website visitor or market segment under review.

The contextual analysis data produced by contextual analysis engine 100 enables publishers and advertisers to make predictions with respect to what kind of targeted content should be delivered to a particular website visitor or market segment. For example, where contextual analysis data indicates that a large portion of the content consumed by a particular website visitor relates to amateur astronomy, publishers and advertisers could use such an insight to identify targeted content that would be appropriate to deliver to that website visitor; such targeted content might include a telescope advertisement. As another example, a news aggregator may establish an automated process to generate contextual analysis data for content provided through a news aggregation website. Such contextual analysis data could be used to identify targeted content that would be appropriate for the different webpages generated by the news aggregation website. For instance, a news article relating to the weather forecast for the upcoming ski season could automatically be linked with targeted content comprising an advertisement for ski equipment. Thus one advantage of the contextual analysis engine disclosed herein is that it facilitates automated matching of a publisher's content with targeted content intended for the same or similar audience, thereby reducing or eliminating the need for the publisher to manually review content and select appropriate targeted content.

Figure 2A:
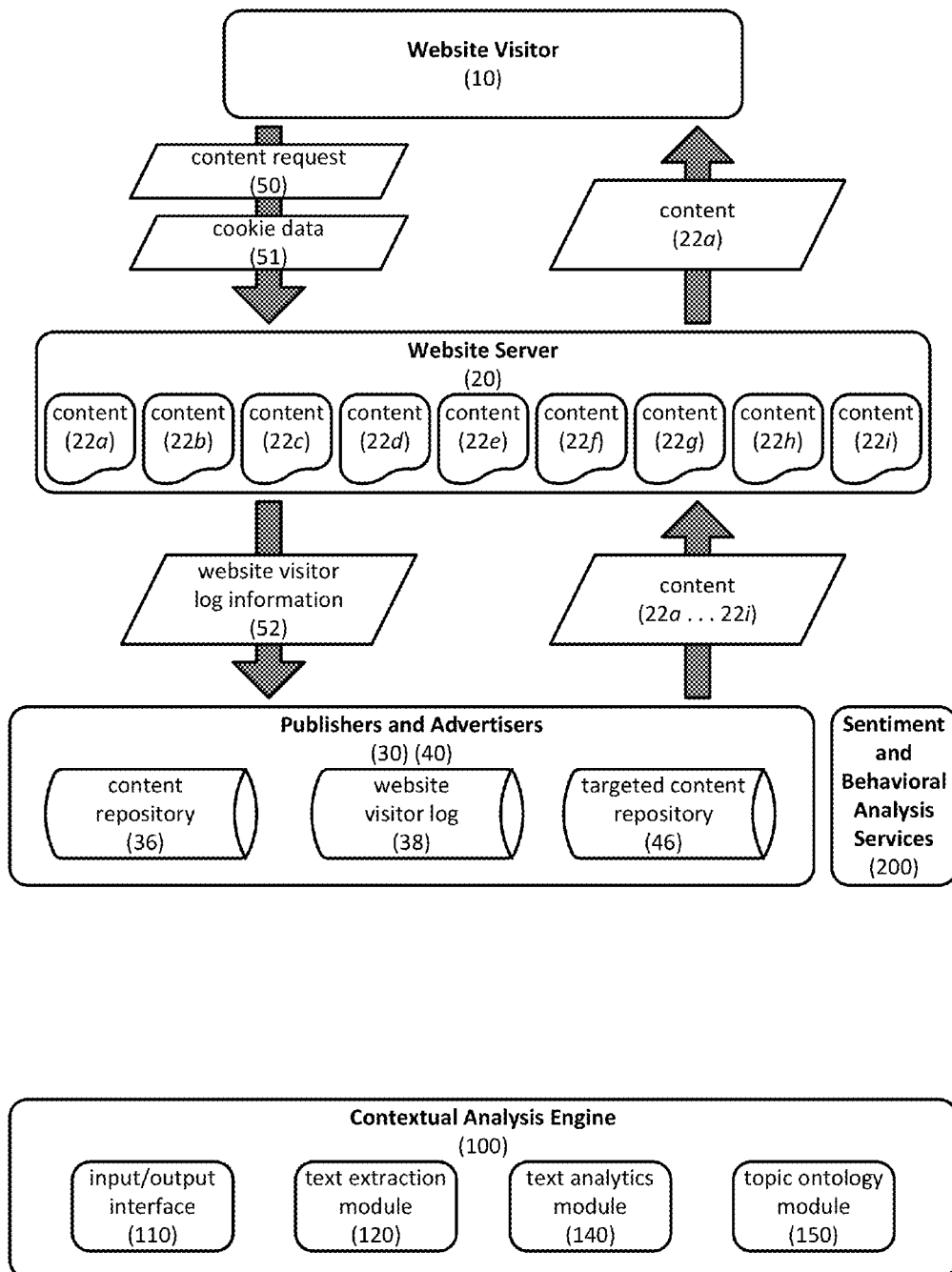
FIG. 2A is a data flow diagram schematically illustrating how website visitor log information can be collected based on monitoring of content delivered from a website server to a website visitor in accordance with an embodiment of the present invention.
Figure 2B:
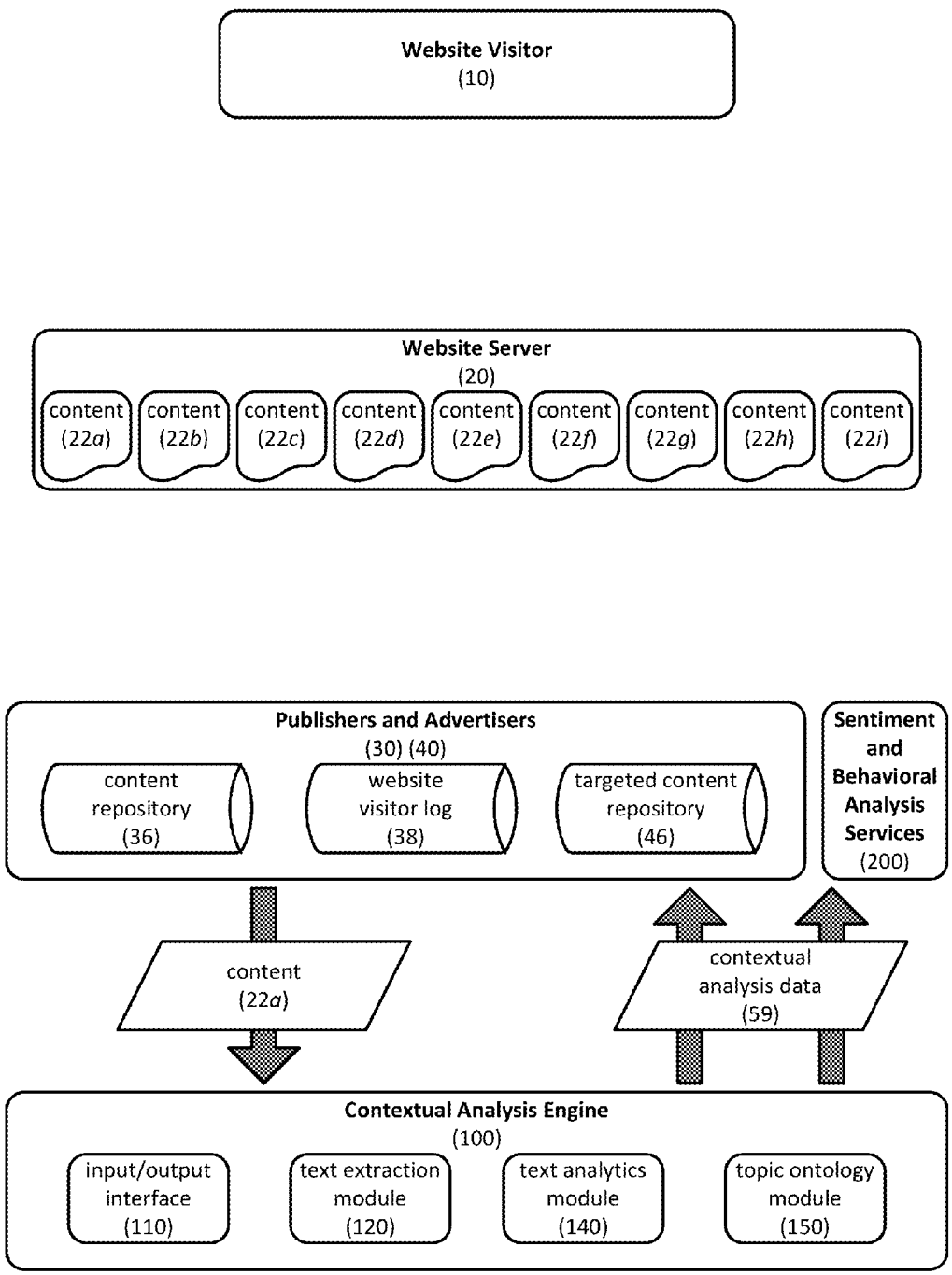
FIG. 2B is a data flow diagram schematically illustrating how contextual analysis data can be generated by a contextual analysis engine based on content received from a publisher in accordance with an embodiment of the present invention.

FIGS. 2A through 2C are data flow diagrams that collectively illustrate an example embodiment of how the components of FIG. 1 can be used to deliver targeted content to a website visitor. In particular, FIG. 2A schematically illustrates one embodiment for collecting website visitor log information 52 based on monitoring of content 22a consumed by website visitor 10. Publisher 30 generates a wide array of content 22a . . . 22i and deploys such content to website server 20. Website visitor 10 sends a content request 50 to website server 20; content request 50 indicates, such as through the use of a uniform resource locator (URL), specific content 22a that website visitor 10 wishes to consume. Content request 50 optionally includes cookie data 51 that that can be used to identify website visitor 10 and/or associate website visitor 10 with a certain market segment. Cookie data 51 may be used, for example, to track the consumption of specific content 22a by website visitor 10 in website visitor log 38. Thus, in certain embodiments, website visitor log information 52 is optionally provided by website server 20 to publisher 30 in response to receipt of content request 50. In such embodiments the recording of website visitor log information 52 can be performed in a way that is transparent to website visitor 10. Website server 20 fulfills content request 50 by sending requested content 22a to website visitor 10. While FIG. 2A illustrates one website visitor and one website server, it will be appreciated that in other embodiments any appropriate number of servers and clients can interact with each other in similar fashion to provide content delivery between networked clients and servers operating in a client-server computing environment generally.

The content delivery methodology illustrated in FIG. 2A can be repeated such that a wide variety of different content 22a . . . 22i can be delivered to website visitor 10, or indeed, to a wide variety of different website visitors. As a result, website visitor log 38 maintained by publisher 30 may grow to include a large quantity of website visitor log information 52 from which content consumption patterns can be discerned. Such content consumption patterns may relate to website visitor 10 individually or to a market segment generally, and can be used to identify particular content that corresponds to a specific website visitor 10 or market segment that advertiser 40 wishes to target. For example, the aggregated website visitor log information 52 can be used to identify certain website visitors who are fans of a particular baseball team; identification of such a market segment is valuable to a particular advertiser that sells souvenirs and memorabilia related to that baseball team. As illustrated in FIG. 2B, the consumed content 22a can be provided to contextual analysis engine 100 which can, in turn, generate contextual analysis data 59 based on received content 22a. Thus contextual analysis engine 100 can be understood as generating contextual analysis data 59 based on content 22a received from publisher 30. This contextual analysis data 59 provides insight into the interests of website visitor 10 or the corresponding market segment that consumed content 22a. For example, contextual analysis data 59 may identify the consumed content as relating to a particular baseball team, and based on such identification, publisher may select targeted content comprising an advertisement for a baseball memorabilia vendor to be incorporated into content subsequently requested by website visitor 10. While FIG. 2B illustrates content 22a as being passed from publisher 30 and/or advertiser 40 to contextual analysis engine 100, in other embodiments a URL referring to a network location where the content to be analyzed is stored can be provided to contextual analysis engine 100.

As described herein, contextual analysis data 59 can be used by publishers 30 and/or advertisers 40 to establish content consumption patterns and identify content associated with a particular website visitor or with a particular market segment. For example, in one embodiment website visitor log 38 and contextual analysis data 59 may indicate that a particular website visitor has browsed a sequence of webpages offering digital cameras for sale. Or, in another embodiment, website visitor log 38 and contextual analysis data 59 may indicate that website visitors having cookies associated with a particular baseball team frequently browse webpages containing content relating to a particular baseball player. Such content consumption patterns can be used by publishers and advertisers to select targeted content to be associated with the consumed content. For example, the website visitor having a history of browsing digital cameras for sale may be served an advertisement from a camera vendor, and members of the market segment associated with the baseball team may be served an advertisement for a sports news blog focusing on that team. Thus publisher 30 can use the contextual analysis data to classify page content and characterize the intent of website visitors, among other things. Likewise, advertisers 40 can use the contextual analysis data to find consumers of specific page content and determine user topic interest, among other things. Contextual analysis data can also optionally be provided to sentiment and behavioral analysis services 200 which can further characterize the website visitor or market segment under review. Such services may be used, for example, to collect demographic and/or content usage data for applications other than subsequent targeted content delivery.

FIG. 2C schematically illustrates one embodiment for delivering requested content 22*b* and targeted content 26 from website server 20 to website visitor 10 in response to a content request 60. Content request 60 optionally includes cookie data 61 that can be used to identify website visitor 10 and/or associate website visitor 10 with a certain market segment. Where content request 60 is identified as originating from a particular website visitor 10 and/or market segment that has consumed content about which contextual analysis data has previously been generated, targeted content 26 that is appropriate for such an audience can be identified. Such targeted content 26 can be retrieved from targeted content repository 46 and served to website visitor 10 along with the originally requested content 22*b*. It will be appreciated that targeted content 26 and originally requested content 22*b* may not necessarily relate to each other. For example, the content request 60 may be directed toward a webpage containing a weather forecast, but such request 60 may include cookie data 61 that—optionally in conjunction with aggregated contextual analysis data 59—can be used to identify the website visitor 10 as having a history of viewing webpages relating to classic automobiles. As a result, targeted content relating to an automobile restoration service can be identified as being relevant to website visitor 10, and can be served to website visitor 10 along with the weather forecast webpage. Targeted content 26 is optionally incorporated into the requested content 22*b* using, for example, a marketing box configured to provide a banner and/or sidebar advertisement, as described herein.

In other embodiments it may not be possible to associate an incoming content request with a particular website visitor or market segment. This may occur, for example, where the content request does not include cookie information, or where the website visitor has enabled an anonymous browsing mode on his/her browser. In this case, the requested content can be analyzed using contextual analysis engine 100 and targeted content that is related to the requested content can be served to the anonymous website visitor. Such analysis can be performed in advance of receiving the content request from the anonymous website visitor, thereby enabling certain content to be "pre-associated" with corresponding targeted content. For example, a news aggregator can be configured to (a) automatically pass aggregated news articles to contextual analysis engine 100 for contextual analysis and (b) use the resulting contextual analysis data to identify appropriate targeted content to be incorporated into the aggregated news article in the event an anonymous request for the news article is received. Thus, for example, a news article relating to changes in hunting licensing requirements can be automatically associated with an advertisement for taxidermy services that is served to anonymous website visitors who request the news article.

FIG. 3 is a block diagram schematically illustrating data flow between selected components of a system that can be used to evaluate digital content consumed by a website visitor in accordance with certain embodiments. In particular, FIG. 3 illustrates that one or more of a variety of content administration tools 34 can (a) send content 22*a* . . . 22*i* to contextual analysis engine 100 for analysis and/or (b) receive contextual analysis data 59 generated by contextual analysis engine 100. While content administration tools 34 are illustrated as being associated with publisher 30 in FIG. 1, it will be appreciated that in other embodiments content administration tools 34 can additionally or alternatively be hosted and/or used by advertiser 40. Leveraging the resources of contextual analysis engine 100 in this way enables publisher 30 and/or advertiser 40 to identify appropriate targeted content to be sent to a particular website visitor 10. In certain embodiments such identification can be performed on an automated basis, for instance without further user input, for example in response to content request 60 initiated by website visitor 10. For example, content administration tools 34 can be configured to leverage website visitor log information 52 and contextual analysis data 59 to make associations between the publisher-generated content stored in content repository 36 and the advertiser-generated targeted content stored in targeted content repository 46. Associations can also be made between a particular website visitor and particular advertiser-generated targeted content. Regardless of how they are generated, such associations can form the basis of subsequent targeted content delivery.

In one embodiment, content administration tools 34 include a web traffic analytics tool 34*a* which can be used, for instance, to generate information about the number of website visitors to a particular website, the browsing patters of website visitors, the geographical location of website visitors, the number of views of particular content and how traffic to certain content changes over time. Such information can be produced using a wide array of data collection techniques, including web server log file analysis, page tagging, Internet Protocol (IP) address tracking, click analytics and browser cookie analysis, to name a few. The information compiled by web traffic analytics tool 34*a* can be used in conjunction with contextual analysis data 59 to form associations between publisher-generated content and advertiser-generated targeted content. The functionality of web traffic analytics tool 34*a* can be provided by Adobe® Analytics (Adobe Systems Incorporated, San Jose, Calif.), Google Analytics (Google Inc., Mountain View, Calif.), or any other suitable web traffic analytics tool having comparable or otherwise competing functionality.

Content administration tools 34 optionally include other services that leverage the contextual analysis data 59 generated by contextual analysis engine 100. For example, in certain embodiments content administration tools 34 include an audience analytics tool 34*b* which can be used, for example, to generate audience information and quantify market segments and target audiences. Such information can be used by a publisher to more precisely define the market segment attracted by the publisher's content, and thus more effectively attract advertisers that wish to reach that market segment. This is helpful for publishers because, in general, advertisers will prefer to work with publishers that are able to more specifically and accurately define the different market segments drawn to the publisher's content. Likewise, the information generated by audience analytics tool 34*b* can also be used directly by advertisers to analyze market segments and generate appropriate targeted content. This information can be used in conjunction with contextual analysis data 59 to form associations between certain market segments and advertiser-generated targeted content. The functionality of audience analytics tool 34*b* can be provided by Adobe® AudienceManager (Adobe Systems Incorporated, San Jose, Calif.), Microsoft SharePoint (Microsoft Corporation, Redmond, Wash.), or any other suitable audience analytics tool having comparable or otherwise competing functionality.

Another type of content administration tool 34 that can leverage the contextual analysis data 59 is a campaign analytics tool 34*c*. Campaign analytics tool 34*c* can be used to analyze the content hosted by a website server, design test pages and perform A/B and/or multivariate testing of test pages to determine which content is most likely to optimize revenue generation for a particular market segment. Such tools can also be used to create and automatically personalize campaign assets that are specifically targeted to such market segments. This allows a wide range of test data to be generated, including multivariate testing result data and conversion rate ranking data for various targeted advertising campaigns. The content 22*a* . . . 22*i* generated as a result of such analysis can be provided to contextual analysis engine 100 so that corresponding contextual analysis data 59 can be generated for the pages under evaluation. This enables the content contained within such pages to be more accurately characterized. The functionality of campaign analytics tool 34*c* can be provided by Adobe® Test&Target® (Adobe Systems Incorporated, San Jose, Calif.), Webtrends Analytics (Webtrends, Portland, Oreg.), or any other suitable campaign analytics tool having comparable or otherwise competing functionality.

In certain embodiments content administration tools 34 include a media optimization tool 34*d* that is capable of managing and optimizing resources devoted to a marketing campaign. More specifically, using certain of the embodiments disclosed herein to generate topic attributes to augment user interest and behavior features enable media optimization tool 34*d* to use predictive modeling techniques to identify opportunities where marketing resources are likely to generate an increased return on investment with respect to impression-level bidding, search engine placement and social advertisement buying. Such predictive models can be based on data collected from a wide variety of web analytics applications and inventory information provided by advertisement placement suppliers. In addition, media optimization tool 34*d* can leverage the functionality of contextual analysis engine 100 to generate more accurate predictions based on content consumption patterns discerned from contextual analysis data 59. The functionality of media optimization tool 34*d* can be provided by Adobe® AdLens™ (Adobe Systems Incorporated, San Jose, Calif.), Sales Cloud (SalesForce.com Inc., San Francisco, Calif.), or any other suitable media optimization tool having comparable or otherwise competing functionality.

Yet another type of content administration tool 34 that can leverage the services provided by contextual analysis engine 100 is an experience management tool 34*e*. Experience management tool 34*e* can be used to provide a variety of different online experiences for a variety of different market segments and/or applications. Examples of such experiences include a mobile experience for a website visitor using a smartphone, a touchscreen experience for a website visitor using a tablet, or a time-based experience for a website visitor who requests web content during a particular time of day. Experience management tool 34*e* allows an advertiser to define specifically targeted web experiences for specific market segments by providing the ability to manage and personalize web content, deliver dynamically generated content, and analyze how such content is consumed by visitors. The market segments used by experience management application 34*e* can be at least partially defined based on contextual analysis data generated by contextual analysis engine 100. The functionality of experience management tool 34*e* can be provided by Adobe® Experience Manager (Adobe Systems Incorporated, San Jose, Calif.), Tealeaf CX (International Business Machines Corporation, Armonk, N.Y.), or any other suitable experience management tool having compatible or otherwise competing functionality.

In addition to the content management and analysis tools described herein, content administration tools 34 may also include one or more content generation tools 34*f*. For example, in certain embodiments content generation tools 34*f* may include tools used for authoring documents, including applications such as word processors, PDF authoring tools, web content management tools and document management systems. Digital assets created using content generation tools 34*f* can be provided to contextual analysis engine 100 so that corresponding contextual analysis data 59 can be generated and correlated with the authored content. This allows content to be "pre-associated" with corresponding targeted content, thus facilitating delivery of such targeted content when, for instance, the authored content is requested from an anonymous website visitor. The functionality of content generation tools 34*f* can be provided by Acrobat.com (Adobe Systems Incorporated, San Jose, Calif.), Microsoft Office (Microsoft Corporation, Redmond, Wash.), or any other suitable content generation tools having compatible or otherwise competing functionality.

Still referring to the example embodiment illustrated in FIG. 3, one or more of content administration tools 34 can be understood as providing a variety of different content 22*a* . . . 22*i* to, and/or receiving contextual analysis data 59 from, contextual analysis engine 100. Contextual analysis data 59 is also optionally provided to sentiment and behavioral analysis servers 200 which can be used to further characterize a particular website visitor or market segment for applications other than targeted content delivery. As illustrated in FIG. 3, the various functionalities of the contextual analysis engine 100 can be implemented using a variety of different interfaces, tools, modules and/or submodules. For example, an input/output interface 110 can be used to manage workflows of a text extraction module 120 and a text analytics module 140. Input/output interface 110 may include an input interface 112 that functions as a job queue or job management system, allowing the services provided by the contextual analysis engine 100 to be scaled and used by a wide variety of clients, such as by one or more of the content administration tools 34 described herein. To this end, an output interface 116 can be configured to generate metadata representations for communicating contextual analysis data 59 that is generated by text analytics module 140 to one or more of the content administration tools 34. A cache manager 114 can be used to administer a results cache 114*a* that stores previously generated results, thereby enabling the contextual analysis engine 100 to avoid redundant analysis operations when possible.

In certain embodiments text extraction module 120 is configured to separate the content which is to be analyzed from content which provides little or no insight into a website visitor's interests. To accomplish this filtering of less relevant content, in certain embodiments text extraction module 120 is configured in a way that overcomes webpage crawling and text extraction problems that may occur when JavaScript or other dynamic content rendering methods are used to generate web content. This allows text to be extracted from a wide variety of content without the need to generate customized scraping applications for particular content types. Text extraction module 120 is optionally provided with a "plug-and-play" architecture that allows third party feature extraction rules to be injected and implemented without regard to the particular content administration tools which will leverage the services provided by text extraction module 120. Text analytics module 140 can be configured to generate a structured categorization of topics included within the extracted content using statistical, semantic, and natural language analytics. For example, in one embodiment text analytics module 140 identifies topics and product features contained within the extracted content using language specific stemming, tokenization, sentence boundary detection, term decompounding, n-gram extraction and named entity recognition techniques. Once identified, the topics can be organized and generalized using one or more ontology or taxonomy tools that allow topic ontologies or taxonomies to be automatically generated and reused. Additional details with respect to the operation of the various components of the contextual analysis engine 100 will be described in turn.

Advertisers and publishers can interact with the various embodiments of the contextual analysis engine disclosed herein using any suitable computing device, such as a desktop computer, a laptop computer, a tablet computer or a mobile phone. Such a computing device may include, for example, a processor, a memory, a user interface and other components configured to meet the computational demands of the various systems and methods disclosed herein. For example, in one embodiment advertisers and/or publishers interact with the contextual analysis engine using a tablet computer having a touch-sensitive user interface. Any suitable network can be used as a medium for communications between one or more of website visitors, website servers, publishers, advertisers and the contextual analysis engine. The network may be a public and/or private network, such as a private local area network operatively coupled to a wide area network such as the Internet. The network connections can be wired, wireless or some combination of wired and wireless connections. In some cases, access to certain computing resources may require credentials such as usernames and passwords or any other suitable security mechanism. In one embodiment advertisers and publishers interact with the contextual analysis engine in a web-based, client-server environment. This advantageously allows the advertisers and publishers to use the familiar interface of a web browser (client) to access the specialized functionalities provided by the contextual analysis engine (server). Thus, in one embodiment the contextual analysis engine is hosted on a given website and implemented using JavaScript or another suitable browser-based technology. Thus the functionality provided by contextual analysis engine may be provided as a hosted cloud-based service provided by a third party, or alternatively, may be provided locally by, for example, a publisher or advertiser. Numerous other configurations and variations will be apparent in light of this disclosure.

Certain of the embodiments disclosed herein can be implemented in various forms of hardware, software, firmware and/or special purpose processors. For example, in one embodiment a non-transient computer readable medium has instructions encoded thereon that, when executed by one or more processors, result in implementation of one or more functionalities of the contextual analysis engine disclosed herein. The computer readable medium can be provided in the form of a computer software application or applet that is tangibly embodied on a memory device, and that can be executed by a computing device having any suitable architecture. The memory device may be a non-transitory storage medium suitable for storing digital information, such as a hard drive, a server, flash memory, and/or random access memory. In alternative embodiments, certain of the functionalities disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out certain of the functionalities described herein. The instructions used to implement functionality associated with various embodiments of the contextual analysis engine can be encoded using a suitable programming language, such as C, C++, object-oriented C, JavaScript or BASIC, or alternatively, using custom or proprietary instruction sets. The instructions may be embodied in a computer software application including a number of different modules, sub-modules or other components of distinct functionality that can provide information to, or receive information from, other components.

Input/Output Interface: Introduction

As described herein, in certain embodiments contextual analysis engine 100 includes input/output interface 110, which is capable of managing workflows of text extraction module 120 and text analytics module 140, administering results cache 114*a*, and interfacing with content administration tools 34 that leverage the services of contextual analysis engine 100. FIG. 4 is a block diagram schematically illustrating selected components of an example embodiment of input/output interface 110. FIG. 4 also illustrates that input/output interface 110 is configured (a) to receive, from any of a variety of different content administration tools 34, a REST-compliant request 70 that includes or is otherwise associated with content 22*a* . . . 22*i*, and (b) to forward content 22*a* . . . 22*i* and operating parameters 76 to text extraction module 120, thereby initiating contextual analysis processing. Input/output interface 110 may also be configured to receive relevant topic data 58 generated by text analytics module 140, organize such relevant topic data 58 based on a preconfigured output format that is persisted in output format repository 118, and return formatted contextual analysis data 59 to content administration tools 34 and/or sentiment and behavioral analysis services 200.

Input/Output Interface: Input Interface

Referring still to FIG. 4, in certain embodiments input/output interface 110 includes input interface 112. Input interface 112 is configured to initiate contextual analysis processing in response to a request received a content administration tool, such as REST-compliant request 70. In such embodiments request 70 will include content 22*a* . . . 22*i* which is to be analyzed, will include a URL pointing to a location where such content is stored, or will be otherwise associated with such content. Input interface 112 may include definitions for one or more input application programming interfaces (APIs) 112*b* that can be used to receive product control commands and status requests from content administration tools 34. In particular, input APIs 112*b* facilitate the submission of URLs, content objects and/or commands to contextual analysis engine 100 based on a generalized interface, thereby making the system easily extensible to a wide variety of different content administration tools 34. In one embodiment input APIs 112*b* are provided to receive both HTML requests and REST-compliant requests for contextual analysis services. In a REST architecture, communications between content administration tools 34 and input/output interface 110 are built around representations of the various resources which are provided by contextual analysis engine 100, and which can be addressed using a uniquely customized uniform resource identifier (URI). Thus, in one embodiment REST-compliant request 70 comprises a URI which conforms to a standardized architecture and which contains information used to initiate, control and/or check the status of contextual analysis processing provided by contextual analysis engine 100.

Figure 5:
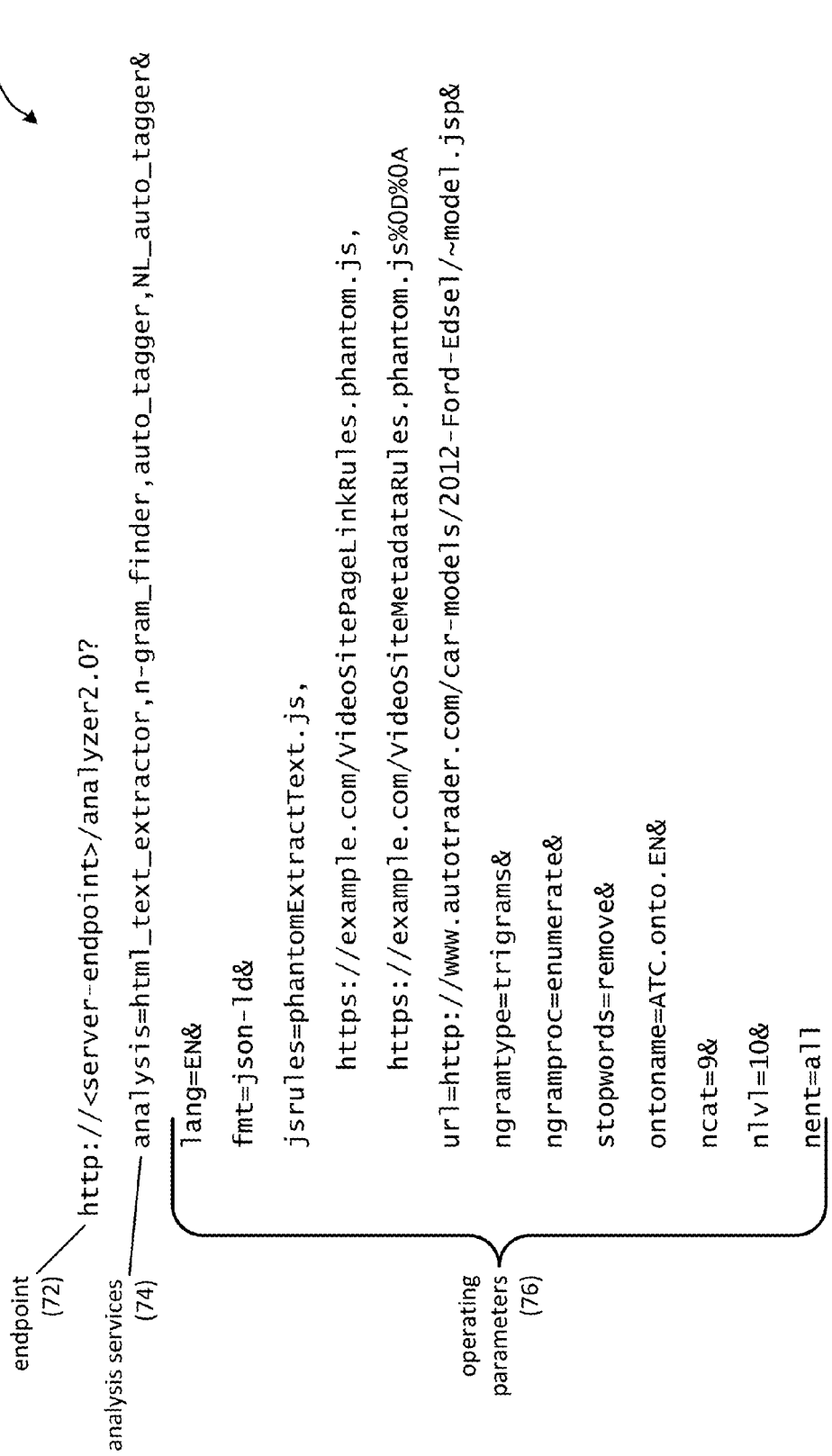
FIG. 5 illustrates an example of a request that can be provided to the input/output interface of FIG. 4 to initiate contextual analysis in accordance with an embodiment of the present invention.

FIG. 5 illustrates an example REST-compliant request 70 comprising a URI that can be sent from content administration tools 34 to input/output interface 110 to initiate contextual analysis processing. Request 70 includes, among other things, an endpoint 72 that specifies a network address where the underlying contextual analysis service is hosted. The URI also identifies one or more extraction and/or analysis services 74 which are to be used to fulfill request 70. In the example illustrated in FIG. 5, the identified services 74 include a text extraction service capable of generating an unstructured corpus of plain text from the content under analysis (html_text_extractor), an n-gram extraction service capable of identifying term n-grams in the extracted text (n-gram finder), an automatic tagging system that can be used to build custom ontologies for the extracted text (auto_tagger), and a natural language named entity recognition and extraction service which can be used to build a directory of sematic entities found within the extracted text (NL_auto_tagger). The foregoing services 74 are provided by way of example, and it will be appreciated that other services may be invoked in other embodiments. The particular extraction and/or analysis services 74 identified in a given request 70 can be selected based on parameters established by the particular content administration tool 34 that initiated the request. Likewise, the originating content administration tool 34 also optionally establishes one or more operating parameters 76 that specify how services 74 are to be implemented. Table A provides examples of selected operating parameters 76 which may be included in request 70; fewer, additional or alternative parameters may be provided in other embodiments. Thus it will be appreciated that the claimed invention is not intended to be limited to any particular set of operating parameters 76.

TABLE A

Example operating parameters included in a REST-compliant request submitted from a content administration tool to the input/output interface of a contextual analysis engine.

| Operating Parameter | Description |
| --- | --- |
| lang | Indicates the default language. Determines which natural language modules are called by text extraction module 120 and text analytics module 140. |
| fmt | Indicates the output format to be used to return contextual analysis data 59. Example output formats include the JavaScript Object Notation for Linked Data (JSON-LD) as standardized by W3C and HTML. Other output formats can be used in other embodiments. |
| jsrules | Indicates specific customized text extraction rules that can be used by text extraction module 120. The rules can be accessible via a provided URL. |
| url | Indicates a network address of content that is to be processed by contextual analysis engine 100. |
| ngramtype | Indicates what type of language model text analytics module 140 should use in extracting n-grams. Examples include unigram, bigram, trigram, four-gram, and five-gram. Other language models can be used in other embodiments. |
| ngramproc | Indicates whether text analytics module 140 should "enumerate" or "merge" common and/or overlapping n-grams. |
| stopwords | Indicates whether text analytics module 140 should retain stop words for each processed n-gram. In the illustrated example, a value "1" indicates that stop words are retained, while a value "0" indicates that stop words are removed. |
| ontoname | Identifies a domain ontology that text analytics module 140 should use when extracting topic models from the extracted text. |
| ncat | Indicates a maximum number of topic model categories that should be extracted by text analytics module 140 for each level of the topic model. |
| nlvl | Indicates a maximum number of levels that should be extracted from the topic model by text analytics module 140. |
| nent | Indicates a quantity of top-ranked semantic named entities that should be extracted by text analytics module 140. |

In certain embodiments the services provided by text extraction module 120 and text analytics module 140 are scalable, meaning that such modules are capable of dynamically responding to demand for increased contextual analysis processing. Scalability can be achieved, for example, through the use of elastic load balancing techniques and/or cluster-based parallelization techniques that allow processing tasks to be dynamically distributed amongst an array of similarly-configured processors. Other scalable processing techniques can be used in other embodiments. However, regardless of the particular computing architecture that is used to achieve scalability, in certain embodiments input interface 112 includes an orchestration manager 112a that manages workflows of contextual analysis engine 100. For example, orchestration manager 112a can be configured to receive incoming content analysis requests, place such requests into a load balancing queue for dispatching and processing as appropriate, and pass such requests to text extraction module 120 and/or text analytics module 140. Orchestration manager 112a can also be configured to coordinate common processing provided by other components of contextual analysis engine 100; such common processing may include, but is not limited to, localization and natural language processing. Thus orchestration manager 112a can be configured to handle large volumes of content (for example, analysis of webpages from millions of page visits) that generate a wide variety of semantic and statistical contextual analysis data.

In such embodiments, orchestration manager 112a is provided with specific knowledge regarding the services provided by text extraction module 120 and text analytics module 140. Such knowledge, when taken in combination with information provided via the particular contextual analysis processing requests received from content administration tools 34, allows the text extraction and analytics modules to operate more efficiently. Contextual analysis workflows such as those described herein can be understood as comprising processing "nodes" which perform a particular analysis. For example, such nodes might define how text extraction module 120 and/or text analytics module 140 handle certain statistical, localization and linguistic tasks. As content is routed from node to node generated results and/or the source content are passed between nodes as well, the result of which is a direct acyclic graph defining the overall workflow. The inter-node data routing that underlies any given workflow is determined by the parameters set by the particular content administration tool requesting a particular contextual analysis service.

Orchestration manager 112a can be configured to identify and leverage efficiencies which can be generated by common data routing amongst such processing nodes, ultimately leading to the elimination of redundant processing sequences. Thus, focusing workflow management on tasks that are specific to the field of contextual analysis allows orchestration manager 112a to more efficiently manage workflows related to such tasks. For instance, certain feature extraction tasks, statistical processing tasks and natural language processing tasks may be common to both text extraction module 120 and text analytics module 140. Where an incoming request for contextual analysis services calls for such common processing to be invoked, orchestration manager 112a can be configured to allocate workflows such that redundant processing is avoided. Conventional workflow orchestration techniques tend to be focused on discrete document content management tasks and/or forms processing workflows and involve relatively modest volumes of data. Such techniques would be unable to generate meaningful efficiencies if applied to the large volumes of data involved in contextual analysis applications such as described herein.

Input/Output Interface: Cache Manager

Referring again to the example embodiment illustrated in FIG. 4, input/output interface 110 optionally includes cache manager 114 which is configured to administer and search the contents of results cache 114a, thereby further reducing the likelihood of redundant processing. In particular, where it is detected that content 22a . . . 22i has already been processed by contextual analysis engine 100, cache manger 114 can be configured to supply corresponding contextual analysis data 59 saved in results cache 114a directly to the requesting content administration tool 34. Results cache 114a can be provided with any appropriate database architecture, such as a database using the Structured Query Language (SQL) or the "Not Only" SQL ("NoSQL"). Providing such caching functionality allows the processing associated with text extraction module 120 and text analytics module 140 to be bypassed, which can in turn substantially accelerate the apparent response time of contextual analysis engine 100 from the perspective of content administration tools 34. This is particularly advantageous for applications in which text extraction is computationally demanding, such as in the case of webpages containing JavaScript elements or other dynamic content that are extracted using a headless browser such as PhantomJS, as will be described herein in conjunction with text extraction module 120. In general, cache manager 114 can detect duplicative contextual analysis requests using one or more of a timestamp, a content modification signature, or duplicate content detection techniques.

FIG. 6 is a flowchart illustrating an example method 1140 for determining whether contextual analysis data corresponding to an incoming contextual analysis request is available in results cache 114a. Method 1140 can be implemented, for example, using cache manger 114 illustrated in FIG. 4, although other implementations can be used in other embodiments. Method 1140 commences when content to be analyzed is received (1141), for example from one of content administration tools 34. A last-modified timestamp for the received content ($t_r$) can be captured (1142), such as by extracting such information from a header included within the received content. Where the received content is recognized as having been previously analyzed, such as by matching a filename, URL or hash, a timestamp for the corresponding cached contextual analysis data ($t_c$) can be retrieved (1143) from results cache 114a. In such embodiments timestamp $t_c$ indicates when the retrieved content was last analyzed by contextual analysis engine 100. Where the retrieved content is not recognized has having been previously analyzed, timestamp $t_c$ can be set to zero, thereby ensuring that $t_r > t_c$. Where a last-modified timestamp for the retrieved content cannot be identified and extracted, timestamp $t_r$ can be set to the present time, likewise ensuring that $t_r > t_c$.

Additionally or alternatively, a hash corresponding to the received content ($h_r$) can be generated (1144) using one or more of a variety of different hashing techniques. Example hashing techniques include hashing the entire received content, for example using a 64-bit secure hash algorithm (SHA), the MD5 or MD6 message digest algorithms, or hashing select HTML elements, such as headers or image tags, contained within the received content. Thus in certain embodiments multiple hashes $h_{r1}, h_{r2}, \ldots h_{rn}$ are generated. Where the received content is recognized as having been previously analyzed, a hash for the content corresponding to the cached contextual analysis data $h_c$ can be retrieved (1145) from results cache 114a. Where is received content is not recognized as having been previously analyzed, hash $h_c$ can be set to zero, thereby ensuring that $h_r \neq h_c$.

Still referring to the example embodiment illustrated in FIG. 6, the timestamps $t_r$ and $t_c$, or the hashes $h_r$ and $h_c$ can be compared to determine whether the received content differs from previously analyzed content (1146). It will be appreciated that either comparison technique can be used to make such a determination, and that in certain embodiments the processes of capturing and retrieving timestamp data (1142, 1143), or the processes of generating and retrieving hash data (1144, 1145) are optionally omitted. Where either the retrieved content has a later timestamp than the corresponding cached contextual analysis data (that is, where $t_r > t_c$), or where the generated and retrieved hashes are different (that is, where $h_r \neq h_c$), input/output interface 110 can be configured to pass the retrieved content to the text extraction module 120 for contextual analysis processing (1147), as illustrated in FIG. 4. However, where the retrieved content has an earlier or identical timestamp as compared to the corresponding cached contextual analysis data (that is, where $t_r \leq t_c$), and where the generated and retrieved hashes are the same, input/output interface 110 can be configured to bypass contextual analysis processing of the retrieved content, and return cached contextual analysis data to the requesting content administration tool. This technique advantageously accelerates the apparent response time of contextual analysis engine 100 in cases where content has previously been subjected to contextual analysis processing.

Input/Output Interface: Output Interface

Referring again to the example embodiment of FIG. 4, input/output interface is illustrated as including output interface 116. Output interface 116 is configured to receive relevant topic data 58 generated by text analytics module 140, generate formatted metadata representations of such relevant topic data 58, and communicate the resulting formatted contextual analysis data 59 to one or more of the content administration tools 34 and/or sentiment and behavioral analysis services 200. Such formatted metadata representations can be generated by a reporting and visualization module 116a, and may be provided with a data structure conforming to a preconfigured output format that is defined and stored in output format repository 118. In one embodiment the preconfigured output format comprises a key-value data structure organized according to a semantic graph model, examples of which will be described in turn. In addition to such reporting and visualization functionality, in certain embodiments output interface 116 is also configured to interface with cache manager 114 to persist the generated contextual analysis data 59 in results cache 114a so as to facilitate the reuse of such data when subsequent requests for analysis of the same underlying content are received. Output interface 116 may include definitions for one or more output APIs 116b that can be used to provide formatted contextual analysis data 59 to content administration tools 34 based on a generalized interface, thereby enabling a wide variety of tools 34 to leverage data 59. Output APIs 116b can also be configured to interact with previously generated contextual analysis data stored in results cache 114a, as well as with the various output formats stored in repository 118.

FIG. 7A illustrates selected portions of an example output schema 500 that can be used to report and visualize contextual analysis data 59 generated by contextual analysis engine 100. In this example embodiment, output schema 500 uses a document container model having a hierarchical tree structure with three principal sections: an @comment section 510, an @context section 520, and an @graph section 530. The @comment and @context sections are examples of "schema resource nodes" which describe a particular type of contextual analysis. On the other hand, @graph section 530 is an example of an "analyzer/enhancer node" which contains analysis attributes, property names and results of the contextual analysis. Output schema 500 may include additional, fewer or alternative sections in other embodiments. Each of the three sections contains a collection of resources and metadata. In certain embodiments the document container model uses a format consistent with existing industry standards such as the W3C Resource Description Framework (RDF), the Extensible Markup Language (XML) encoding specification, or the JavaScript Object Notation (JSON) data interchange standard. Other data interchange standards for representing data structures can be used in other embodiments.

Figure 7B:
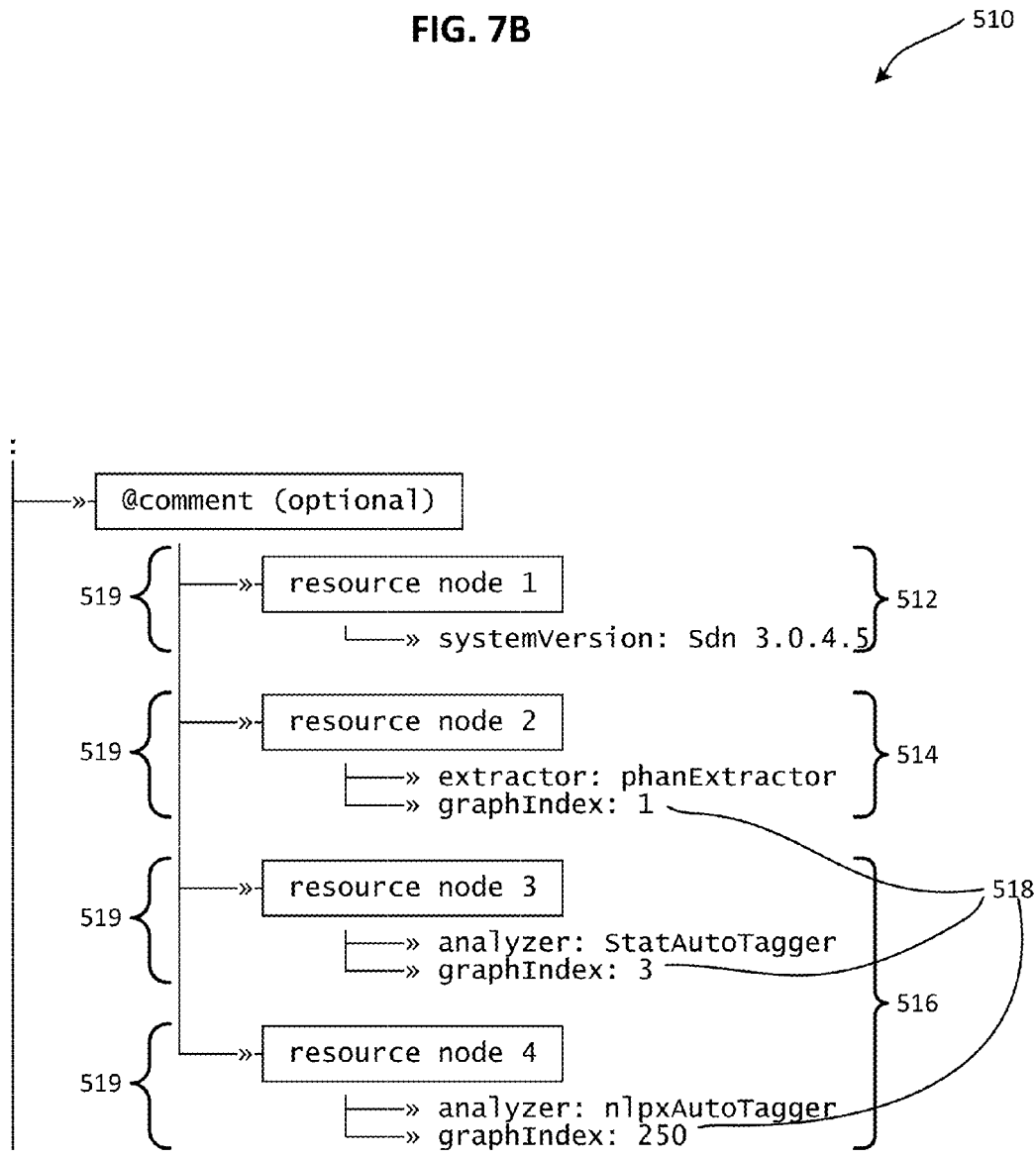
FIG. 7B illustrates an example of an @comment section forming part of the output schema of FIG. 7A, the @comment section indicating system version information, identifying text and analysis tools used to generate contextual analysis data provided elsewhere in the output schema, and providing graph index parameters that identify nodes of the output schema where certain contextual analysis data can be found, in accordance with an embodiment of the present invention.

Still referring to FIG. 7A, output schema 500 includes an optional @comment section 510 which can be used to indicate, among other things, version information associated with output schema 500, which analysis outputs are provided in output schema 500, and a graph index parameter specifying where particular analysis outputs can be found within output schema 500. For instance, @comment section 510 may specify which HTML extractor or extractors were used to gather text from a given webpage and which statistical and natural language auto-tagging tools were used to analyze the extracted text. The @comment section 510 can be used to provide additional or alternative information in other embodiments, and thus it will be appreciated that the present invention is not intended to be limited to the provision of specific information in @comment section 510, which may even be omitted altogether in some applications. FIG. 7B illustrates an example @comment section 510 indicating system version information 512, identifying a text extraction tool 514 and two text analysis tools 516 used to generate contextual analysis data provided elsewhere in output schema 500, and providing graph index parameters 518 that identify specific nodes of output schema 500 where the particular contextual analysis data can be found. Each of these various data elements can be provided in a dedicated resource node 519.

Output schema 500 also optionally includes @context section 520 which can be used to indicate namespaces for one or more external resources used by text extraction module 120 and/or text analytics module 140 to generate the contextual analysis data presented in output schema 500. Such namespaces may specify, for example, one or more domain ontology resources to be leveraged by text analytics module 140, such as general topic ontologies used by publisher 30 or specific consumer product category ontologies used by advertiser 40. The resources can be identified, for example, by a URL pointing to a network location where the resource can be accessed. Specifying the resources used to generate formatted contextual analysis data 59 facilitates subsequent interpretation and understanding of such data. In the example output schema 500 illustrated in FIG. 7A, @context section 520 provides a plurality of namespace declarations 522 that specify the contextual analysis resources used to generate the contextual analysis data provided elsewhere in output schema 500. The @context section 520 can be used to identify additional or alternative resources and parameters in other embodiments, and thus it will be appreciated that the present invention is not intended to be limited to the provision of specific information in @context website 520, which may even be omitted altogether in some applications.

Referring still to the example output schema 500 illustrated in FIG. 7A, @graph section 530 contains a plurality of resource nodes which contain data generated by text extraction and/or text analysis operations. In this example embodiment, each resource node within @graph section 530 includes @id and @type descriptors that provide information about the particular contextual analysis tools used to generate the data provided in their respective nodes. For example, a first resource node 531 includes @id and @type descriptors 531a indicating that node 531 contains text extraction data generated by a "phanExtractor" component accessible at www.example.com/phanExtractor. A second resource node 532 includes @id and @type descriptors 532a indicating that node 532 contains natural language auto-tagging data generated by an "NLPAutoTagger" component accessible at www.example.com/NLPA/v4.5. A third resource node 533 includes @id and @type descriptors 533a indicating that node 533 contains statistical auto-tagging data generated by a "StatisticalAutoTagger" component accessible at www.example.com/stata/v5.3. A fourth resource node 534 includes @id and @type descriptors 534a indicating that node 534 contains theme-based summarization data generated by a "Summarizer" component accessible at www.example.com/summarize/v5.2. It will be appreciated that the resource nodes described here are provided by way of example only, and that, in general, output schema 500 may contain tens, hundreds, thousands or more such nodes, each providing data generated by a certain text extraction and/or analysis service.

In addition to the @id and @type descriptors, each of the resource nodes within @graph section 530 includes a foundCandidate node which provides specific page or tag information such as extracted text outputs or auto-tagging analysis outputs. For example, FIG. 7C illustrates an expanded view of first resource node 531 that forms part of output schema 500 and that includes data generated by text extraction module 120. As described above, @id and @type descriptors 531*a* provide information about the particular text extraction tool used to generate the data provided in foundCandidate node 531*b*. For instance, the @type descriptor illustrated in FIG. 7C indicates that a phantomExtractor tool was used to generate the data provided in foundCandidate node 531*b* corresponding to first resource node 531; this corresponds to the "graphIndex: 1" parameter provided in @comment section 510 illustrated in FIG. 7B. The subsequent foundCandidate node 531*b* includes one or more sub-nodes which provide information such as links to extraction rules 531*ba* used to generate extracted text, links to webpage metadata 531*bb*, an unstructured corpus of extracted text 531*bc*, and a network address 531*bd*, such as a URL, pointing to a location where the analyzed content can be accessed. It will be appreciated that additional or alternative sub-nodes may be included in foundCandidate node 531*b*, and that the present invention is not intended to be limited to any particular data provided in foundCandidate node 531*b*.

While the first resource node 531*a* illustrated in FIG. 7C contains data generated by text extraction module 120, other resource nodes included within output schema 500 may include various analytical data generated by text analytics module 140. For example, second resource node 532 includes a foundCandidate node 532*b* containing natural language auto-tagging data, third resource node 533 includes a foundCandidate node 533*b* containing statistical auto-tagging data, and a fourth resource node 534 includes a foundCandidate node 534*b* containing theme-based summarization data. Additional or alternative types of analytical data can be provided in other embodiments. The analytical data included within such foundCandidate nodes can be described in terms of "tags", which refer to particular features or concepts identified in the corpus of extracted text. For example, sub-nodes within the various foundCandidate nodes may further characterize a particular tag by providing information such as semantic type (for example, person, place or thing), tag frequency and tag location within the analyzed content. The found-Candidate node may include tens, hundreds, thousands or more such sub-nodes describing the various candidate tags identified by text analytics module 140.

For example, FIG. 7D illustrates an expanded view of third resource node 533 that forms part of output schema 500 and that includes data generated by text analytics module 140. As described above, @id and @type descriptors 533*a* provide information about the particular text analytics tool used to generate the data provided in foundCandidate node 533*b*. For instance, the @type descriptor illustrated in FIG. 7D indicates that a StatAutoTagger tool was used to generate the data provided in foundCandidate node 533*b* corresponding to third resource node 533; this corresponds to the "graphIndex: 3" parameter provided in @comment section 510 illustrated in FIG. 7B. The subsequent foundCandidate node 533*b* includes one or more sub-nodes 533*b*' which provide information regarding particular features identified in the corpus of extracted text. There may be tens, hundreds, thousands or more sub-nodes 533*b*' included within foundCandidate node 533*b*, depending on the number of features extracted from the analyzed content. The specific data provided within sub-nodes 533*b*' depends on the particular text analytics tool identified in the @id descriptor, but in general, may include data characterizing the extracted features, such as by specifying the feature (see, for example, "value" label 540), the feature semantic type (for example, person, place or thing), feature frequency within the analyzed content (see, for example, "termfreq" label 542), feature location within the analyzed content based on original word position (provided within, for example, a collapsible "offset" label 544), feature length expressed as a number of characters (see, for example, "length" label 546), and feature relevancy score (see, for example, "score" label 548). Additional or alternative types of analytical data can be provided in other embodiments, and thus it will be appreciated that the present invention is not intended to be limited to any particular type of data provided within sub-nodes 533*b*'.

As illustrated in FIGS. 7A through 7D, the semantic graph model that is used to represent the formatted contextual analysis data 59 contains metadata sections which are specific to the particular type of contextual analysis performed on given content. These metadata sections are presented using a key-value output schema that combines the feature information generated by text analytics module 140 with the hierarchy structure defined by one or more ontologies to generate a topic model for the content under analysis. Contextual analysis data generated by multiple individual analysis operations, such as the example contextual analysis data illustrated and described in conjunction with FIGS. 7A through 7D, can be aggregated and combined across a wide range of different content consumed by a particular user or market segment. Such aggregation can be performed by summing term frequency counts for features and categories of interest and computing a weighted average for specific features and/or categories of interest. The resulting weighted average can be expressed in terms of an average frequency count per page or other unit of consumed content, thereby providing publisher 30 and/or advertiser 40 with an easily understandable evaluation of the most relevant topics contained within given content.

Output schema 500 provides several advantages in the context of reporting contextual analysis results. For instance, the semantic annotators provided within the output schema 500 are self-describing, thereby allowing the schema to serve as a self-contained data structure representing the results of the underlying contextual analysis. Such self-describing semantic annotators can be generated, for example, by the particular natural language or statistical auto-tagging tool used to generate the underlying contextual analysis data. At the same time, including references to the various ontology resources used to generate such data enables client-specified tag ontology information to be easily extracted from output schema 500. Such tag ontology information may include, for example, statistical and/or relationship data associated with a particular tag extracted from the analyzed content. Output schema 500 is also easily extensible since new annotators generated by subsequently-developed contextual analysis tools, such as auto-taggers, content classifiers and theme-based content summarizers, can be easily incorporated into an existing schema. Thus, from the perspective of content administration tools 34 requesting the services of contextual analysis engine 100, output schema 500 effectively provides a uniform API model for the text extraction and analysis tools used the generate the requested contextual analysis data 59.

Text Extraction

Figure 8:
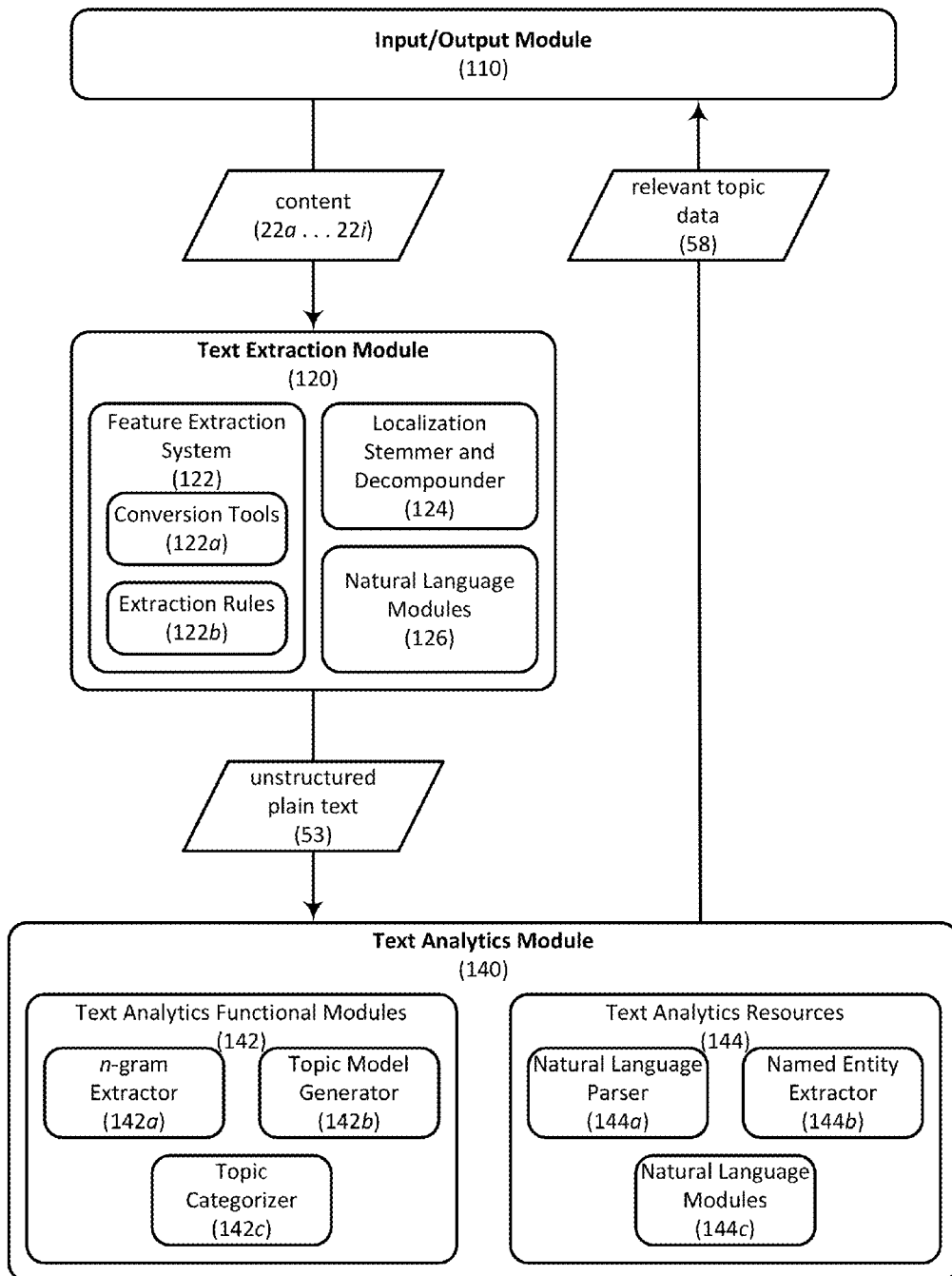
FIG. 8 is a block diagram schematically illustrating selected components of text extraction and text analytics modules that are configured in accordance with an embodiment of the present invention and that form part of the contextual analysis engine of FIG. 3.

As described herein, in certain embodiments contextual analysis engine 100 includes text extraction module 120, which is capable of separating content which is to be the subject of contextual analysis from content which provides little or no insight into a consumer's interests. Based on the results of that separation, text extraction module 120 is further capable of generating a corpus of plain text that can then be analyzed by text analytics module 140. FIG. 8 is a block diagram schematically illustrating selected components of an example embodiment of text extraction module 120. From a functional and data flow standpoint, FIG. 8 also illustrates that text extraction module 120 is configured to receive content 22*a* . . . 22*i* from input/output module 110 and generate an unstructured corpus of plain text 53 that is derived from the received content. In such embodiments, text extraction module 120 includes (a) a feature extraction system 122 configured to apply modular extraction rules capable of extracting plain text from a wide variety of incoming content, (b) a localization stemmer and decompounder 124 configured to derive root words from extracted content for a given language, and (c) one or more natural language modules 126 that provide language-specific rules which can be leveraged by the various components of text extraction module 120.

Feature extraction system 122 can be configured to extract plain text and metadata from incoming content such as webpages, word processing documents, PDF files and other types of content containing formatted and/or unformatted text. To this end, feature extraction system 122 uses a variety of sub-modules which are configured to extract plain text from specific content types. These sub-modules may include, for example, conversion tools 122*a* such as PDF to text converters and content-specific modular extraction rules 122*b*. For instance, modular extraction rules 122*b* can be configured to enable a corpus of plain text to be extracted from a variety of different webpages, including webpages where JavaScript or dynamic rendering methods are used to generate web content. Such modular extraction rules 122*b* allow plain text to be extracted without the use of customized scraping applications. For webpages that do not contain active content, a computer program that provides recursive download of HTML content via HTTP can be used; one example of such a program is GNU "wget" (http://www.gnu.org/software/wget). Text extraction module 122 is optionally provided with a "plug-and-play" architecture that allows third party feature extraction rules and/or programs—such as the aforementioned wget—to be injected and implemented.

In one embodiment feature extraction system 122 encapsulates the functionality of a headless browser that is capable of generating and extracting information from web content without actually rendering and displaying the web content. Such functionality can be provided, for example, by a WebKit plugin that executes modular extraction rules 122*b* within a security sandbox for a given content item. WebKit (http://www.webkit.org) is an open source browser engine software component that enables web browsers to render web pages and implement functionality such as following links when clicked by a user, managing a backward-forward navigation list, and managing a browsing history. Executing modular extraction rules 122*b* within a security sandbox provides an added level of security against malicious content contained within the analyzed content, and also reduces the likelihood that the functionality provided by contextual analysis engine 100 is executed by unauthorized users.

In certain embodiments the aforementioned headless browser can be provided by PhantomJS (http://phantomjs.org). PhantomJS is a headless WebKit plugin scriptable with a JavaScript API that allows webpages to be rendered, and the resulting content to be extracted, without ever actually displaying the webpage. Because PhantomJS uses a JavaScript API, modular extraction rules 122*b* can be configured to extract specific segments of content using JavaScript commands. Thus, in an example embodiment a jQuery framework can be injected within the context of a webpage to allow modular extraction rules 122*b* to leverage full JavaScript functionality. jQuery (http://jquery.com) is a JavaScript library that facilitates the selection, traversal and manipulation of DOM elements which are used to represent objects in HTML documents. Thus, in such an implementation, the result is a text extraction schema using DOM-based full-rendering that can reliably extract plain text from active content with a high degree of accuracy. This advantageously allows plain text to be extracted from PDF files, standard HTML content, dynamic content generated by JavaScript elements, and other content formats that may by generated by a website. Example data generated by such a schema is illustrated in the output schema of FIG. 7C.

Thus in certain embodiments modular extraction rules 122*b* are defined and represented using JavaScript commands. Such rules can be used to traverse, filter and process DOM elements generated by a PhantomJS headless WebKit plugin, as described herein. Templates for such rules provide content filtering functionality and allow users to use existing editors or integrated development environment (IDE) applications to define custom extraction rules. Extraction rules 122*b* are described as being "modular" in the sense that they comprise rule blocks, or "functions", that can be reused for a variety of different applications and content types. For example, FIG. 9 illustrates a first example of a modular extraction rule that can be used to extract metadata from a webpage, such metadata including, for example, description tags. Likewise, FIGS. 10A and 10B illustrate a second example of a modular extraction rule that can be used to extract various types of webpage elements, such as titles, text, metadata and page links. The example rules illustrated here can be implemented using a jQuery framework which provides access to robust JavaScript processing functionality. These rules also rely on modular functions that can be reused in other extraction rules configured to extract text from other content types. Examples of such modular functions include the getMetaContent( ) function illustrated in FIG. 9, and the getNodeText( ), getElemetnsTexts( ), getAttributeTexts( ) and getMetaContent( ) functions illustrated in FIGS. 10A and 10B.

Referring again to FIG. 8, text extraction module 120 optionally includes localization stemmer and decompounder 124 and/or one or more natural language modules 126. Localization stemmer and decompounder 124 is configured to derive root words from extracted content for a given language, thus allowing normalized text to be provided to text analytics module 140. Language-specific stemming, tokenization, sentence boundary detection and decompounding techniques can be used in this process. For example, German-language decompounding techniques can be used to break the German word "Rechtsanwaltskanzleien" into "Recht", "anwalt" and "kanzlei"; or the English word "classroom" into "class" and "room". English-language stemming techniques can be used to identify the root or stem of a given word extracted from processed content.

Table B provides illustrates the stemming of the sentence, "Relational Databases are used to process structured queries.", as determined according to a standardized stemming technique; it will be appreciated that a wide variety of existing or subsequently-developed stemming and decompounding techniques may be used to process text extracted by feature extraction system 122.

TABLE B

Example stemmed output of the sentence "Relational Databases are used to process structured queries."

| Input Text | Stemmed Output |
| --- | --- |
| Relational | Relat |
| Databases | Databas |
| are | ar |
| used | us |
| to | to |
| process | process |
| structured | structur |
| queries | queri |
| . | . |

As illustrated in FIG. 8, natural language modules 126 can be provided for one or more languages for which text extraction is to be performed. Localization stemmer and decompounder 124 can thus leverage such modules when performing language-specific operations such as stemming, tokenization and sentence boundary detection. Thus advantageously provides an additional degree of extensibility to contextual analysis engine 100 since integration of additional natural language modules 126 allows content in additional languages to be processed. In other embodiments natural language modules 126 are omitted and language-independent stemming and/or decompounding techniques can be used instead.

Text Analysis

Figure 11:
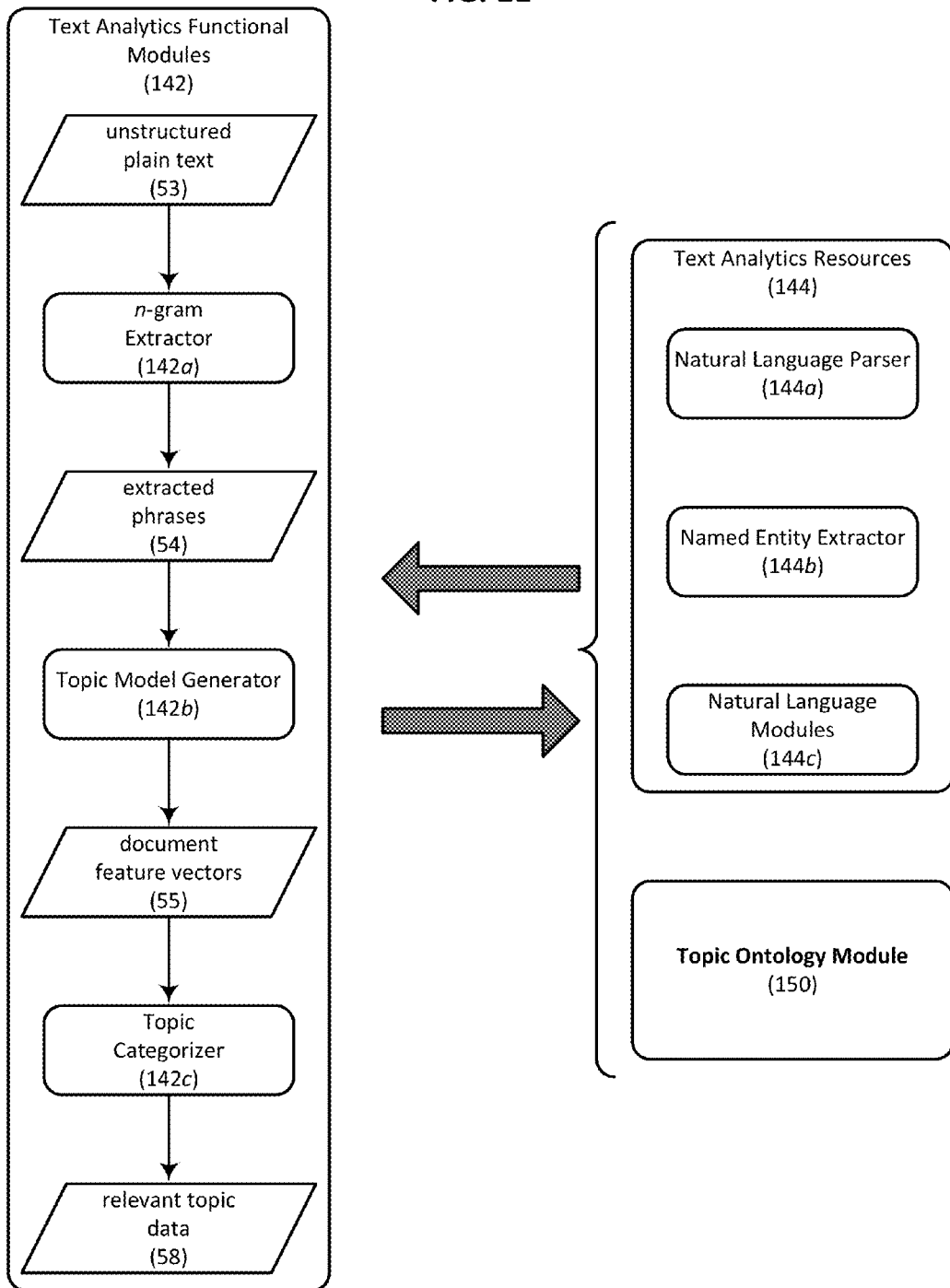
FIG. 11 is a block diagram schematically illustrating how various components and resources provided by a text analytics module can be used to derive relevant topic data from unstructured plain text produced by a text extraction module in accordance with an embodiment of the present invention.

As described herein, in certain embodiments contextual analysis engine 100 includes text analytics module 140, which is capable of using statistical, semantic and natural language analytics to generate a structured categorization of relevant topics included within the corpus of unstructured plain text generated by text extraction module 120. The relevant topics can be organized using compact high-dimension document feature vectors based on statistical n-gram and symbolic natural language models, thereby allowing the original content to be summarized in terms of the most relevant topics contained therein. FIG. 8 illustrates selected components of an example embodiment of text analytics module 140, which includes both text analytics functional modules 142 as well as text analytics resources 144. Text analytics functional modules 142 can be understood as including one or more of a variety of different analytical subcomponents which are described herein, such as n-gram extractor 142a, topic model generator 142b and topic categorizer 142c. Likewise, text analytics resources 144 can be understood as including one or more of a variety of different analytical resources such as natural language parser 144a, named entity extractor 144b and natural language modules 144c. Fewer additional or alternative subcomponents may be included in text analytics module 140 in other embodiments, and thus it will be appreciated that the present invention is not intended to be limited to any particular set of subcomponents or corresponding functionality provided by text analytics module 140. From a functional and data flow standpoint, FIG. 8 also illustrates that text analytics module 140 is configured to receive unstructured plain text 53 generated by text extraction module 140 and generate relevant topic data 58 which is provided to input/output module 110. Relevant topic data 58 can then be used to generate the semantic graph model described herein with respect to output interface 116. FIG. 11 illustrates an exemplary process for using the various components and resources provided by text analytics module 140 to derive relevant topic data 58 from unstructured plain text 53.

As illustrated in FIG. 11, in certain embodiments text analytics functional module 142 includes n-gram extractor 142a, which is capable of identifying phrases of varying length within unstructured plain text 53. In particular, n-gram extractor 142a is capable of (a) determining the relative frequencies at which identified multi-term phrases, also referred to a n-grams, occur within unstructured plain text 53, and (b) generating a listing of extracted phrases 54, optionally supplemented by the relative frequency data. This can be accomplished using statistical and lexical methodologies, such as use of punctuation, to identify, count and extract such phrases. Thus in certain embodiments n-gram extractor leverages services provided by, for example, natural language parser, 144a, named entity extractor 144b and/or natural language modules 144c. Provision of different text analytics resources 144 for alternative languages enables n-gram extractor 142a to process content in such alternative languages. Optionally, n-gram extractor 142a can also be configured to filter stop words from the identified n-grams. Stop word filtering can be implemented based on a parameter specified in the REST-compliant request used to initiate contextual analysis processing, as described herein in conjunction with Table A. The frequency data for extracted phrases 54, combined with positional data indicating the relative location of the extracted phrases 54 within the content as a whole, facilitates the identification of phrases that can be understood as having a greater relative significance. For example, a phrase that appears at five locations that are relatively evenly distributed across the document can be assumed to have a greater significance than a phrase that appears at five locations within a single paragraph of a multi-paragraph document. A variety of different existing or subsequently-developed n-gram extractors can be used to provide the functionality described herein; one example of such an n-gram extractor is disclosed in U.S. Pat. No. 8,090,724 (Welch et al., issued 3 Jan. 2012).

Figure 12:
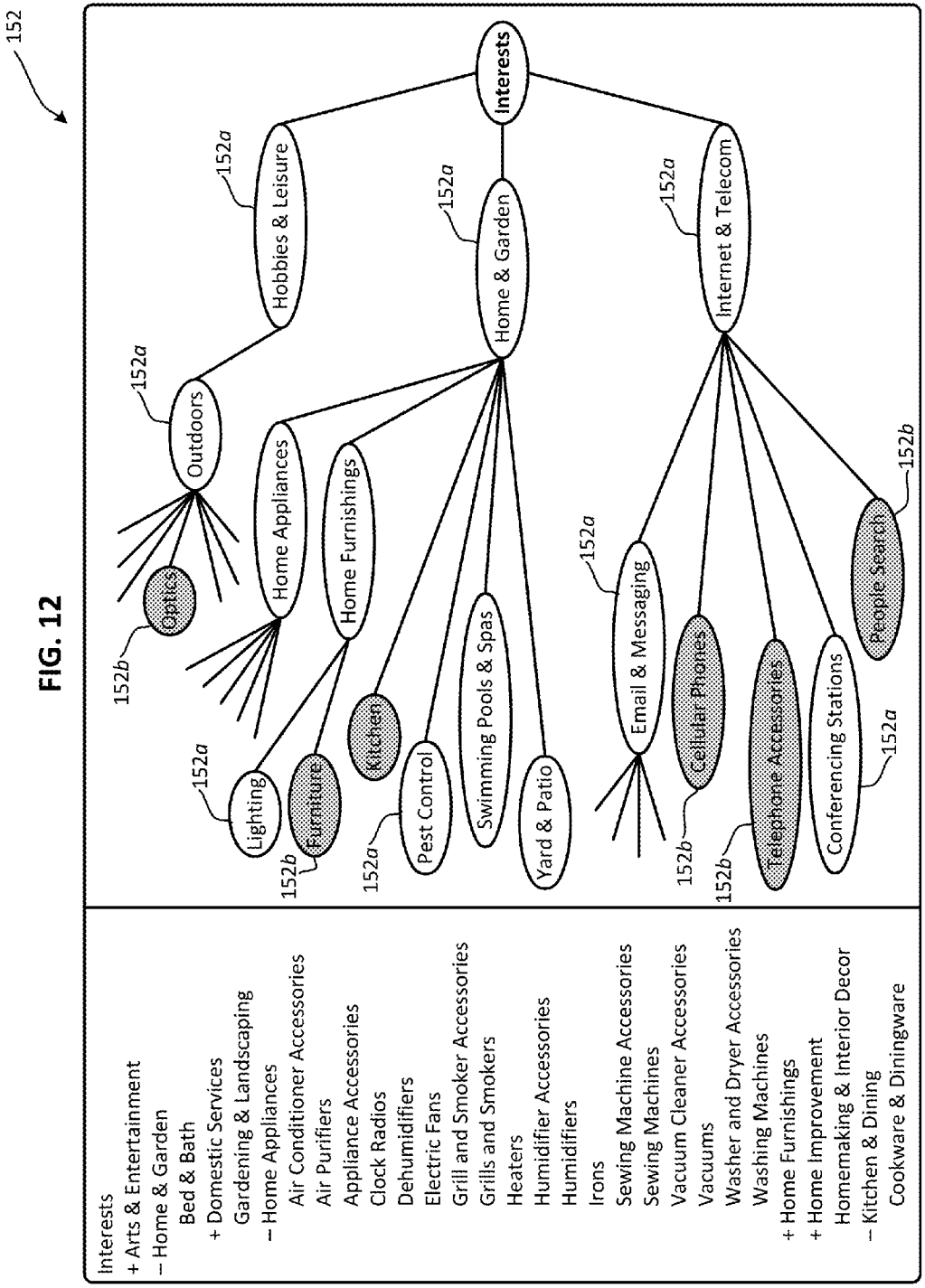
FIG. 12 is a graphical representation of a general topic ontology that can be used by a topic categorizer to identify relevant topic data based on previously generated document feature vectors in accordance with an embodiment of the present invention.

Referring still to FIG. 11, topic model generator 142b can be used to analyze the extracted phrases and frequency data generated by n-gram extractor 142a, identify phrases which are understood has being particularly relevant to the content being analyzed, and build high-dimension document feature vectors 55 based on the relevancy analysis. This can be accomplished using one or more hierarchical topic ontologies that include generalized (that is, higher-level in the hierarchy) categories for the identified phrases. Examples of such ontologies may include, for instance, general topic ontologies used by publisher 30 or specific consumer product category ontologies used by advertiser 40. The ontologies leveraged by topic model generator 142b can be provided by topic ontology module 150. Such ontologies may be represented using a directed-acyclic graph of topic categories; FIG. 12 is a graphical representation of one such general topic ontology 152 that can be used by topic model generator 142b to build high-dimension document feature vectors 55. Ontology 152 comprises topics 152a (indicated by white ovals) that form part of a base ontology, as well as subsequently added topics 152b (indicated by shaded ovals) based on the demands of a particular contextual analysis application.

Thus, high-dimension document feature vectors 55 can be understood as being formed by generating a list of extracted phrases 54 derived from unstructured plain text 53, and then collecting such phrases into a document feature vector, wherein each extracted phrase is associated with a measure of frequency such as an occurrence count and/or a relevance factor. The elements of the resulting document feature vectors can be represented in a tabular format. Table C illustrates the elements of an example document feature vector obtained by extracting 1-gram and 2-gram phrases, along with corresponding frequency data, from a short essay on the modern history of the Czech Republic. While only nine extracted phrases are listed in Table C for the purposes of simplicity, it will be appreciated that, in general, the generated document feature vectors 55 may include hundreds, thousands or more elements based on the actual number of phrases extracted from the content under analysis.

TABLE C

Elements of a high-dimension document feature vector associated with a short essay on the modern history of the Czech Republic.

| Index | Extracted Phrase | Frequency Count | Relevance Factor |
|---|---|---|---|
| 1 | Czech Republic | 8 | 2.72 |
| 2 | land | 2 | 0.68 |
| 3 | communist regime | 2 | 0.68 |
| 4 | Republic member | 2 | 0.68 |
| 5 | word Czech | 1 | 0.34 |
| 6 | won plurality | 1 | 0.34 |
| 7 | widespread English | 1 | 0.34 |
| 8 | west northwest | 1 | 0.34 |
| 9 | variant | 1 | 0.34 |

Document feature vectors 55 generated using the methodologies disclosed herein, as well as the corresponding relevance factors as illustrated in Table C, can be represented by a hash map or a dictionary, thereby eliminating any need to provide a global vocabulary index. This advantageously allows the document feature representation to be sparse in that only the present terms are represented, as compared to providing a zero value for conventional non-sparse vector representations. Thus, using the methodologies disclosed herein, the size of the collection of the extracted document features can be understood as O(m), wherein m is the number of extracted features. This represents a significant improvement over conventional techniques which use a global vocabulary index, and where the size of the collection of the extracted document features would be O(m'×N), where m' is the average number of features per document and N is the total number of analyzed documents.

Referring again to FIG. 11, document feature vectors 55 are subsequently processed by topic categorizer 142c, which is configured to identify, rank and categorize topics contained within a content topic ontology, thereby generating relevant topic data 58. The content topic ontology can be acquired or generated, for example, from topic ontology module 150. Topic categorizer 142c may also be referred to as an "auto-tagger" since the identified topics may also be referred to as "tags". Since topic ontologies can be understood as having a hierarchical structure, the topics within relevant topic data 58 may include one or more parent or grandparent (higher level) topics derived from the ontology. This expansive tagging technique advantageously allows increasingly more general topics to be derived from document feature vectors 55 identified by topic model generator 142b. Moreover, by leveraging the knowledge provided by the topic ontology, relevant topic data 58 may include topics that would not otherwise be identified based only on analysis of unstructured plain text 53 extracted from the content under analysis.

FIG. 13A illustrates portions of an example of a hierarchical topic model listing relevant topic data 58 that is produced by topic categorizer 142c, and that is based on the same short essay used to generate the document feature vector elements listed in Table C. Relevant topic data 58 provides a hierarchical listing of topics, each of which is allocated to a given branch of the hierarchy. FIG. 13B illustrates an example branch of the hierarchy containing relevant topic data, and in particular, identifying a topic 58b, a relevancy score 58a, and a frequency count 58c. The example topic model illustrated in FIG. 13A demonstrates how content from which the word "news" may not have been extracted can nevertheless be determined to be relevant to a topic such as "World News" by virtue of the hierarchical knowledge levels provided by the topic model ontology used to generate relevant topic data 58.

A variety of different methods can be used to obtain relevancy score 58a. In one embodiment, illustrated in FIG. 13A, the number of document features that match the respective topic features contained within the topic model ontology can be recursively added. Feature counts for each topic category are propagated to the parent category, and this process continues until the root of the topic ontology is reached. For example, the topic category "Central & Eastern Europe" is indicated as including 31 occurrences, within the analyzed content, nineteen of which fall within the topic subcategory "Czechoslovakia", six of which fall within the topic subcategory "Poland", and so on. Likewise, of the nineteen occurrences that fall within the topic subcategory "Czechoslovakia", eight fall within the topic subcategory "Czech Republic", three fall within the topic subcategory "Bohemia", and one falls within the topic subcategory "Prague". Topic categories and subcategories can then be ranked by their respective weights as determined by dividing the count for a particular topic by the total number of features contained within the immediate parent in the hierarchy. Thus, referring again to the example illustrated in FIG. 13A, the topic category "Czechoslovakia" has a relevancy score 58a of 19÷31=0.613.

Other techniques for obtaining relevancy score 58a for the various topics included in topic data 58 can be used in other embodiments. For example, in an alternative embodiment a topic frequency/inverse document frequency (TF-IDF) technique is used to obtain relevancy score 58a for the various identified topics. In general, a TF-IDF value increases proportionally to the number of times a topic appears in given content, but this increase is offset by the frequency of the words comprising the topic generally, which helps to control for the fact that some words are generally more common than others. The generalized frequency of words is defined by an IDF database which is optionally included among text analytics resources 144 provided by text analytics module 140. Using a TF-IDF technique, a frequency is determined for each topic category and a corresponding inverse document frequency (IDF) is determined using the IDF database. An L2 normalized TF-IDF relevancy score can be determined by taking the square root of the product of the topic frequency counts for each corresponding topic. This process can be repeated for each hierarchical branch of the topic data 58 until the root of the topic ontology is reached.

Thus, certain embodiments of the contextual analysis methodology disclosed herein use a statistical n-gram model to organize features into a topic ontology, and using the ontology structure to infer more general topics which are still relevant to the content being analyzed. The ability make such generalizing inferences based on statistical classifications is a significant advantage with respect to conventional analysis methods that rely on simple counting techniques. Furthermore, incorporation of natural language processing techniques into the methodologies disclosed herein advantageously facilitates the discovery of more common and proper nouns (for example, named entities) across topic domains. This facilitates the compilation of a more comprehensive entity, topic and brand model for the particular content being analyzed. Topic domains can be further customized for both the statistical ontology as well as the entity topic ontology used by, for example, natural language parser 144a and named entity extractor 144b.

Referring again to the example embodiment illustrated in FIG. 8, text analytics resources 144 can be understood as including one or more of a variety of different analytical tools such as natural language parser 144a, named entity extractor 144b and natural language modules 144c. Natural language parser 144a uses transformation grammar rules to tag words with their appropriate part-of-speech, which can be useful to topic model generator 142b in the generation of high-dimension document feature vectors 55. In certain embodiments natural language parser 144a is also configured to determine a semantic type (for example, person, place or thing) for the extracted topics; these extracted entity types themselves can be organized into an ontology which can later be used to further increase the relevance of the extracted data to publisher 30 and/or advertiser 40. Natural language parser 144a can also be used to support named entity recognition and extraction. For example, in certain embodiments named entity extractor 144b can be configured to identify and extract known topics based on tagged noun expressions identified by natural language parser 144a. The extracted topics can be used by topic categorizer 142c to generate relevant topic data 58 which forms the basis for contextual analysis data 59. Natural language parser 144a and named entity extractor 144b can use a wide variety of existing or subsequently-developed techniques to perform part-of-speech tagging and named entity extraction.

As illustrated in FIGS. 8 and 11, natural language modules 144c can be provided for one or more languages for which textual analysis is to be performed. For example, n-gram extractor 142a, natural language parser 144a and named entity extractor 144b can leverage natural language modules 144c when performing language-specific operations such as term extraction, part-of-speech tagging and named entity extraction. Thus advantageously provides an additional degree of extensibility to contextual analysis engine 100 since integration of additional natural language modules 126 allows content in additional languages to be processed and analyzed. In other embodiments natural language modules 144c are omitted and language-independent analysis techniques can be used instead. As illustrated in FIG. 8, in certain embodiments both text extraction module 120 and text analytics module 140 include one or more natural language modules. It will be appreciated that in alternative embodiments the text extraction and analytics modules can share the resources provided by a common set of natural language modules, and therefore that the natural language modules need not be associated with a particular text extraction or analytics module.

Example Use Case and Methodology

Figure 14A:
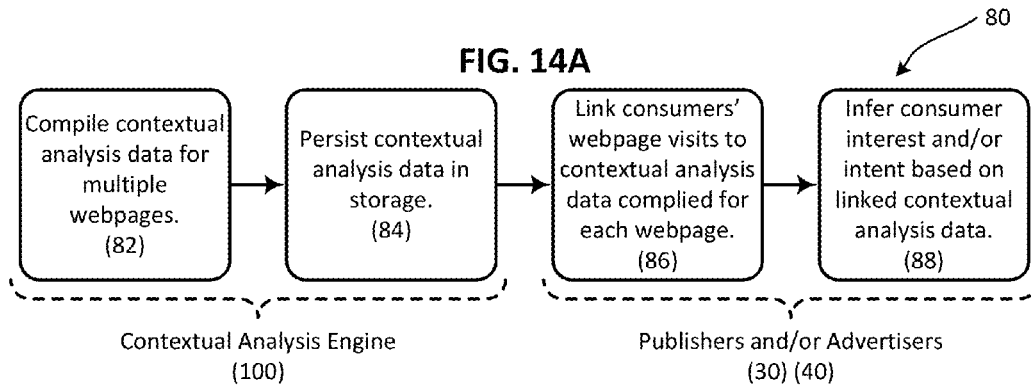
FIG. 14A is a flowchart illustrating a method for inferring a consumer's interests and/or intent based on linking the consumer's webpage visits to topics extracted using a contextual analysis engine in accordance with an embodiment of the present invention.

Certain embodiments of the systems and methodologies disclosed herein can be used to deliver targeted content to a website visitor. More specifically, such embodiments allow publishers and advertisers to analyze the interests and purchase intent of consumers based on, among other things, their website browsing activities. FIG. 14A is a flowchart illustrating a method 80 for inferring a consumer's interests and/or intent based on linking the consumer's webpage visits to topics extracted using a contextual analysis engine as described herein. Specifically, method 80 commences with compiling contextual analysis data for multiple webpages (82). Such contextual analysis data may be represented, for example, using output schema 500 illustrated in FIGS. 7A through 7D. For instance, in one embodiment publisher 30 may generate such contextual analysis data for all or a portion of the webpages available on a given website. In another application, advertiser 40 may generate contextual analysis data for all or a portion of the webpages identified in the browsing history extracted from consumers belonging to a particular market segment. In any case, the generated contextual analysis data may be persisted in storage (84), such as through the use of results cache 114a illustrated in, and described herein in connection with, FIG. 3. In an alternative embodiment, output interface 116 can be configured to present the contextual analysis data in a format specifically adapted for use by advertisers, such as in a spreadsheet listing the various webpages provided in a given website, along with the corresponding topics provided in each page. Such a format is particularly useful to an advertiser administering, for example, a vehicle sales website comprising a plurality of pages, each of which is dedicated to a particular vehicle make and model. As illustrated in FIG. 14A, the generation and persistence of contextual analysis data can be performed by various components of contextual analysis engine 100.

Figure 14B:
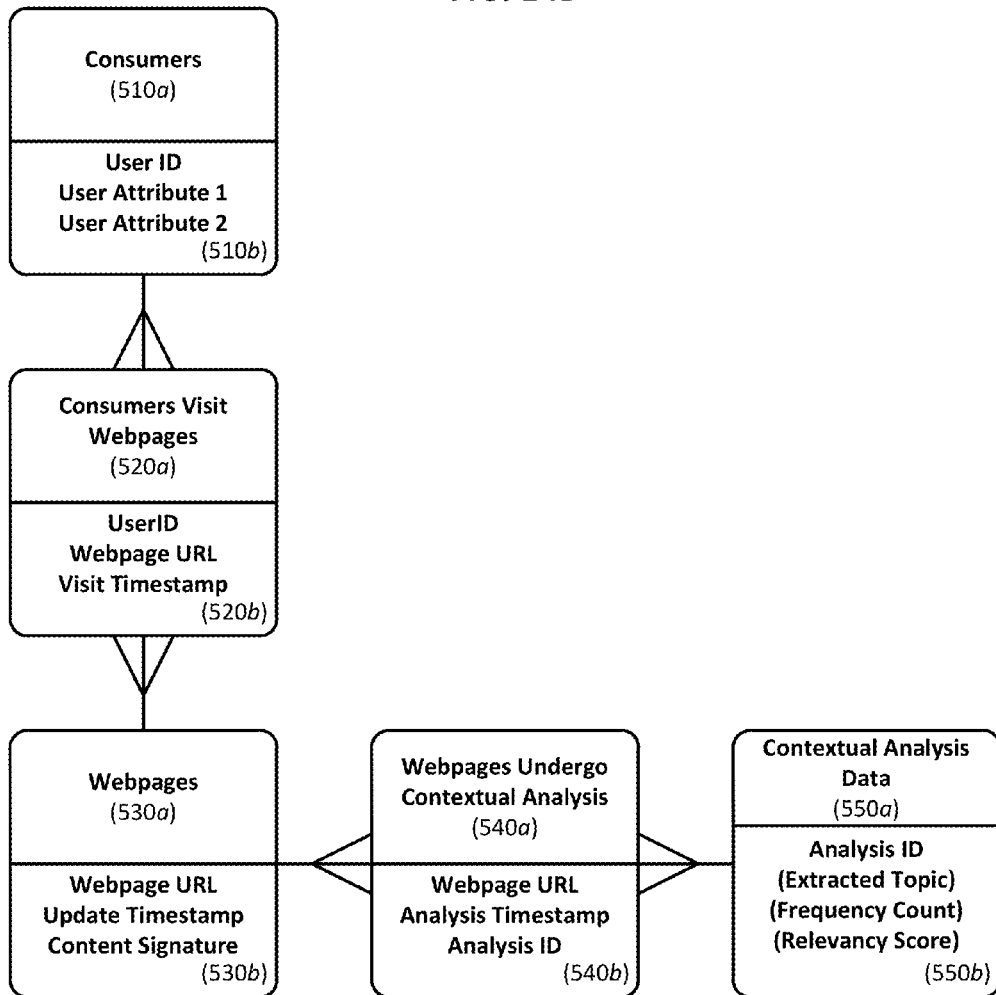
FIG. 14B is a data model illustrating how consumers, webpages visited by the consumers, and contextual analysis data generated from the webpages can be related in a way that allows the consumers' interests and/or intent to be inferred in accordance with an embodiment of the present invention.

As consumers browse a publisher's website and consume content provided via individual webpages, the consumers' webpage visits can be linked to the previously-generated contextual analysis data compiled for each webpage (86). This linking can be accomplished, for example, using website visitor log information 52 as illustrated in FIG. 2A, thereby providing publishers—and by extension, advertisers—with knowledge of the specific webpages visited by a specific consumer. Collection of such data over multiple page visits over an extended time period gives publishers and advertisers a strong indicator of the content a particular consumer has been browsing, and therefore, of his or her purchase intentions. Thus method 80 concludes with the drawing of inferences relating to consumer interest and/or intent based on the linked contextual analysis data (88). This knowledge allows publishers and advertisers to identify targeted content that would be appropriate for a particular consumer. For example, a consumer who has a history of visiting webpages containing information about a new sports car can be served targeted content provided by a retailer selling the specific car in which the consumer has a demonstrated interest. As illustrated in FIG. 14B, the process of linking webpage visits to particular topics of interest and inferring consumer interest and/or intent can be performed by publishers 30 and/or advertisers 40.

FIG. 14B is a data model illustrating how consumers 510a, webpages 530a, and contextual analysis data 550a can be related in a way that allows the consumers' interests and/or intent to be inferred from their respective webpage visits. Webpages 530a can be associated with one or more attributes 530b, such as an identifying URL, a timestamp indicating when the page was last updated, and a hash that acts as a content signature. Webpage attributes 530b can be used to determine if a given webpage has been modified since its content was last subjected to contextual analysis. Additional, fewer or alternative webpage attributes 530b can be used in other embodiments. Likewise, contextual analysis data 550a results from an analysis of content contained within webpages 530a, and can also be associated with one or more contextual analysis attributes 550b, such as an analysis identifier that links to a list of extracted topics as well as frequency and relevancy data associated with the extracted topics. When a given webpage undergoes contextual analysis 540a, input/output interface 110 can be configured to persist analysis results 540b in an analysis database, such as results cache 114a, which stores the webpage URL, a timestamp associated with the analysis, and an analysis identifier that provides a link to the results of the analysis. This information can be stored in a database table that indicates the results of a particular contextual analysis that was performed at a particular time. The analysis timestamp and the webpage update timestamp can be compared such that the webpage is subjected to contextual analysis once again if it is subsequently updated, as illustrated in FIG. 6.

In similar fashion, consumers 510a can be identified by one or more consumer attributes 510a, such as a user ID, an IP address or any other suitable identifying information. When a consumer visits a given webpage 520a, publishers and/or advertisers can use website visitor log information 520b such as the user ID, the URL of the visited webpage and a timestamp corresponding to the time of the visit to identify relevant contextual analysis data corresponding to that visit. Such information, which indicates when a particular webpage was visited by a particular consumer, can be stored in website visitor log 38, as illustrated in FIG. 1. This information allows contextual analysis data, and more specifically, a topic model associated with the visited webpage, to be associated with a specific webpage visit from a specific consumer at a specific time, thereby providing insight into the interest and/or intent of the consumer.

CONCLUSION

Numerous variations and configurations will be apparent in light of this disclosure. For instance, one example embodiment of the present invention provides a method of analyzing digital content, the method comprising receiving a corpus of text. The method further comprises extracting a plurality of n-grams from the corpus of text. The method further comprises constructing a multi-dimensional document feature vector based on the plurality of n-grams. The method further comprises categorizing a plurality of topics derived from the multi-dimensional document feature vector based on a topic ontology. The method further comprises generating a hierarchical listing of the plurality of categorized topics that includes a relevancy ranking for at least a portion of the topics included within the hierarchical listing. In some cases the multi-dimensional document feature vector is further based on a frequency of each of the plurality of extracted n-grams. In some cases the corpus of text is unstructured. In some cases the corpus of text is received from a text extraction module that includes a headless browser. In some cases constructing the multi-dimensional feature vector further comprises ranking the plurality of n-grams according to a relevance factor that is based on a frequency at which a given n-gram appears within the corpus of text. In some cases the plurality of topics derived from the multi-dimensional feature vector are selected by identifying (a) n-grams within the topic ontology and (b) topics form the topic ontology that have a parent relationship with the n-grams identified in (a). In some cases the plurality of topics derived from the multi-dimensional feature vector are selected by identifying (a) n-grams within the topic ontology and (b) topics form the topic ontology that have a direct parent relationship with the n-grams identified in (a). In some cases the plurality of topics derived from the multi-dimensional feature vector are selected by identifying (a) n-grams within the topic ontology and (b) topics form the topic ontology that have an indirect parent relationship with the n-grams identified in (a). In some cases the hierarchical listing of the plurality of categorized topics further includes a frequency count for at least a portion of the topics included within the hierarchical listing. In some cases the multi-dimensional document feature vector does not include any n-grams that were not extracted from the corpus of plain text. In some cases at least one of the plurality of topics is not included within the plurality of n-grams extracted from the corpus of text.

Another embodiment of the present invention provides a method of delivering targeted content to a consumer, the method comprising generating contextual analysis data for a plurality of webpages that are made available to a consumer via a website. The contextual analysis data includes a hierarchical listing of topics with corresponding relevancy rankings for each of the plurality of webpages. The method further comprises compiling website visitor log information indicating which of the plurality of webpages have been visited by the consumer. The method further comprises analyzing the contextual analysis data corresponding to the webpages visited by the consumer to identify at least one topic as being relevant to the consumer. The method further comprises identifying targeted content to be delivered to the consumer. The targeted content is related to the at least one relevant topic. In some cases (a) at least one of the plurality of webpages includes a content topic that is dynamically generated when the webpage is rendered; and (b) the dynamically-generated content topic is included within the hierarchical listing of topics. In some cases the relevancy ranking for each of the plurality of webpages is calculated using a topic frequency/inverse document frequency technique. In some cases the method further comprises (a) sending a requested webpage to the consumer, the requested webpage including a marketing box; and (b) sending the targeted content to the consumer, wherein the targeted content is configured to be displayed in the marketing box.

Another embodiment of the present invention provides a system for analyzing digital content, the system comprising an n-gram extractor configured to extract a plurality of n-grams from an unstructured corpus of text. The system further comprises a topic model generator configured to construct a multi-dimensional feature vector based on the plurality of n-grams. The system further comprises a topic categorizer configured to categorize a plurality of topics derived from the multi-dimensional document feature vector based on a topic ontology. At least one of the plurality of categorized topics is not included within the plurality of n-grams extracted from the unstructured corpus of text. In some cases the n-gram extractor is further configured to generate frequency data corresponding to the extracted plurality of n-grams, the frequency data comprising a frequency count. In some cases the n-gram extractor is further configured to filter one or more stop words from the extracted plurality of n-grams. In some cases the topic categorizer is configured to categorize the plurality of topics based on a plurality of topic ontologies. In some cases the system further comprises a named entity extractor and a natural language parser, wherein (a) the named entity extractor is configured to extract additional topics from the unstructured corpus of text based on one or more tagged noun expressions identified by the natural language parser; and (b) the topic model generator is configured to construct the multi-dimensional feature vector based also on the additional extracted topics.

Another embodiment of the present invention provides a non-transient computer readable medium having instructions encoded thereon that, when executed by one or more processors, causes a digital content analysis process to be carried out. The process comprises receiving an unstructured corpus of text. The process further comprises extracting a plurality of n-grams from the unstructured corpus of text. The process further comprises constructing a multi-dimensional document feature vector based on the plurality of n-grams. The process further comprises categorizing a plurality of topics derived from the multi-dimensional document feature vector based on a topic ontology. The process further comprises generating a hierarchical listing of the plurality of categorized topics that includes a relevancy ranking for at least a portion of the topics included within the hierarchical listing. In some cases constructing the multi-dimensional feature vector comprises ranking the plurality of n-grams according to a relevance factor that is at least partially based on a spatial distribution of a given n-gram within the unstructured corpus of text. In some cases the plurality of topics derived from the multi-dimensional feature vector are selected by identifying (a) n-grams within the topic ontology and (b) topics form the topic ontology that have a parent relationship with the n-grams identified in (a). In some cases a quantity of categorized topics in the hierarchical listing is greater than a quantity of n-grams extracted from the corpus of text.

The foregoing description of the embodiments of the present invention has been presented for the purposes of illustration and description. It is not intended to be exhaustive or to limit the invention to the particular disclosed embodiments. Many modifications and variations are possible in light of this disclosure. Thus, it is intended that the scope of the invention be limited not by this detailed description, but rather by the claims appended hereto.

What is claimed is:

1. A method of analyzing digital content, the method comprising:
   receiving a corpus of text;
   extracting a plurality of n-grams from the corpus of text;
   constructing a multi-dimensional document feature vector, wherein the multi-dimensional document feature vector includes at least a portion of the n-grams extracted from the corpus of text and a relevance factor corresponding to each of the n-grams included in the multi-dimensional document feature vector;
   extracting a portion of topics included in a topic ontology, wherein each of the extracted topics is related to at least one of the n-grams included in the multi-dimensional document feature vector;
   generating a hierarchical listing that includes the extracted topics, wherein the hierarchical listing comprises a first plurality of nodes in a first branch of the hierarchical listing, and a second plurality of nodes in a second branch of the hierarchical listing, and wherein a particular node in a particular branch of the hierarchical listing includes a particular extracted topic; and
   assigning a relevancy score to the particular extracted topic, wherein the assigned relevancy score is based on (a) the relevance factor corresponding to an n-gram that is related to the particular extracted topic, and (b) relevancy scores assigned to other extracted topics included in the particular branch of the hierarchical listing,
   wherein the hierarchical listing has a hierarchical structure corresponding to a hierarchical structure of the topic ontology, such that topics extracted from a relatively higher ontology level are in a corresponding higher hierarchical level of the listing, and topics extracted from a relatively lower ontology level are in a corresponding lower hierarchical level of the hierarchical listing, and
   wherein the hierarchical listing includes an extracted topic that is not included in the plurality of n-grams extracted from the corpus of text.

2. The method of claim 1, wherein each of the relevance factors included in the multi-dimensional document feature vector is based on a frequency of the corresponding n-gram.

3. The method of claim 1, wherein the corpus of text is unstructured.

4. The method of claim 1, wherein the corpus of text is received from a text extraction module that includes a headless browser.

5. The method of claim 1, further comprising ranking n-grams included in the multi-dimensional document feature vector according to their respective relevance factors.

6. The method of claim 1, wherein the topics extracted from the topic ontology are selected for extraction by identifying n-grams within the topic ontology and topics from the topic ontology that have a parent relationship with at least one of the identified n-grams.

7. The method of claim 1, wherein the topics extracted from the topic ontology are selected for extraction by identifying n-grams within the topic ontology and topics from the topic ontology that have a direct parent relationship with at least one of the identified n-grams.

8. The method of claim 1, wherein the topics extracted from the topic ontology are selected for extraction by identifying n-grams within the topic ontology and topics from the topic ontology that have an indirect parent relationship with at least one of the identified n-grams.

9. The method of claim 1, wherein
   the particular node of the hierarchical listing further includes a frequency count for the particular extracted topic, and
   the frequency count corresponds to a number of occurrences, in the corpus of text, of the n-gram that is related to the particular extracted topic.

10. The method of claim 1, wherein the multi-dimensional document feature vector includes only n-grams that were extracted from the corpus of plain text.

11. A system for analyzing digital content, the system comprising:
   an n-gram extractor configured to extract a plurality of n-grams from an unstructured corpus of text;
   a topic model generator configured to construct a multi-dimensional document feature vector that includes at least a portion of the n-grams extracted from the unstructured corpus of text and a relevance factor corresponding to each of the n-grams included in the multi-dimensional document feature vector;
   a topic categorizer configured to extract a portion of topics included in a topic ontology, wherein each of the extracted topics is related to one of the n-grams included in the multi-dimensional document feature vector; and a text analytics module configured to
    generate a hierarchical listing that includes the extracted topics, wherein the hierarchical listing comprises a first plurality of nodes in a first branch of the hierarchical listing, and a second plurality of nodes in a second branch of the hierarchical listing, and wherein a particular node in a particular branch of the hierarchical listing includes a particular extracted topic, and
    assign a relevancy score to the particular extracted topic, wherein the assigned relevancy score is based on (a) the relevance factor corresponding to an n-gram that is related to the particular extracted topic, and (b) relevancy scores assigned to other extracted topics included in the particular branch of the hierarchical listing;
wherein at least one of the extracted topics is not included within the plurality of n-grams extracted from the unstructured corpus of text;
wherein the hierarchical listing has a hierarchical structure corresponding to a hierarchical structure of the topic ontology, such that topics extracted from a relatively higher ontology level are in a corresponding higher hierarchical level of the listing, and topics extracted from a relatively lower ontology level are in a corresponding lower hierarchical level of the hierarchical listing; and
wherein the hierarchical listing includes an extracted topic that is not included in the plurality of n-grams extracted from the corpus of text.

12. The system of claim 11, wherein the n-gram extractor is further configured to generate frequency data corresponding to the extracted plurality of n-grams, the frequency data comprising a frequency count.

13. The system of claim 11, wherein the n-gram extractor is further configured to filter one or more stop words from the extracted plurality of n-grams.

14. The system of claim 11, wherein the topics extracted from the topic ontology are selected for extraction by identifying n-grams within the topic ontology and topics from the topic ontology that have a parent relationship with at least one of the identified n-grams.

15. The system of claim 11, further comprising a named entity extractor and a natural language parser, wherein:
    the natural language parser is configured to identify one or more tagged noun expressions in the unstructured corpus of text;
    the named entity extractor is configured to extract additional topics from the unstructured corpus of text based on the one or more tagged noun expressions identified by the natural language parser; and
    the multi-dimensional document feature vector also includes at least a portion of the extracted additional topics.

16. The system of claim 11, wherein the relevance factor is at least partially based on a spatial distribution of a given extracted n-gram within the unstructured corpus of text.

* * * * *